US012639496B2

(12) United States Patent
Baumgartner et al.

(10) Patent No.: US 12,639,496 B2
(45) Date of Patent: May 26, 2026

(54) SCALABLE, OPTIMAL RETIMING OF MULTI-CLOCKED NETLISTS

(71) Applicant: International Business Machines Corporation, Armonk, NY (US)

(72) Inventors: Jason Raymond Baumgartner, Austin, TX (US); Rohit Dureja, Austin, TX (US); Raj Kumar Gajavelly, Warangal (IN); Robert Lowell Kanzelman, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 634 days.

(21) Appl. No.: 18/318,555

(22) Filed: May 16, 2023

(65) Prior Publication Data

US 2024/0386172 A1     Nov. 21, 2024

(51) Int. Cl.
| | |
|---|---|
| *G06F 30/32* | (2020.01) |
| *G06F 30/323* | (2020.01) |
| *G06F 30/3312* | (2020.01) |
| *G06F 119/12* | (2020.01) |

(52) U.S. Cl.
CPC ........ *G06F 30/323* (2020.01); *G06F 30/3312* (2020.01); *G06F 2119/12* (2020.01)

(58) Field of Classification Search
USPC ....... 716/100, 101, 102, 103, 104, 105, 106, 716/108
See application file for complete search history.

(56) References Cited

U.S. PATENT DOCUMENTS

| | | | | |
|---|---|---|---|---|
| 5,701,441 | A | | 12/1997 | Trimberger |
| 5,828,579 | A | * | 10/1998 | Beausang ........ G01R 31/31704 716/102 |
| 5,949,692 | A | * | 9/1999 | Beausang ........ G01R 31/31704 716/136 |
| 6,536,024 | B1 | * | 3/2003 | Hathaway ................. G06F 1/10 327/295 |
| 6,567,962 | B2 | | 5/2003 | Baumgartner et al. |
| 7,120,883 | B1 | | 10/2006 | van Antwerpen et al. |
| 7,203,919 | B2 | | 4/2007 | Suaris et al. |
| 7,367,002 | B2 | | 4/2008 | Baumgartner et al. |

(Continued)

FOREIGN PATENT DOCUMENTS

| | | |
|---|---|---|
| CN | 109857687 B | 2/2023 |
| TW | 201928666 A | 7/2019 |

(Continued)

OTHER PUBLICATIONS

Baumgartner, J et al., (1999). Model Checking the IBM Gigahertz Processor: An Abstraction Algorithm for High-Performance Netlists. In: Halbwachs, N., Peled, D. (eds) Computer Aided Verification. CAV 1999. Lecture Notes in Computer Science, vol. 1633. pp. 72-83, Springer, Berlin, Heidelberg. https://doi.org/10.1007/3-540-48683-6_9.

(Continued)

*Primary Examiner* — Brian Ngo
(74) *Attorney, Agent, or Firm* — Yuanmin Cai, Esq; Kevin P. Radigan, Esq.; Heslin Rothenberg Farley & Mesiti P.C.

(57) ABSTRACT
Embodiments of the present disclosure provide enhanced systems and methods for implementing enhanced retiming of multiple clock netlists to improve integrated circuit (IC) design quality and provide enhanced retiming with reduced retiming runtime. Disclosed embodiments provide effective and efficient retiming without sacrificing netlist quality, and yield significant speedup of retiming runtime over traditional retiming.

20 Claims, 18 Drawing Sheets

(56)                References Cited

U.S. PATENT DOCUMENTS

| | | | |
|---|---|---|---|
| 7,689,955 | B1 | 3/2010 | van Antwerpen et al. |
| 7,774,724 | B2 | 8/2010 | Hunt et al. |
| 7,945,880 | B1 | 5/2011 | Albrecht et al. |
| 8,024,686 | B2 | 9/2011 | Ispir et al. |
| 8,296,256 | B2 | 10/2012 | Arbel et al. |
| 8,806,399 | B1 | 8/2014 | Van Antwerpen et al. |
| 9,053,274 | B1 | 6/2015 | Van Antwerpen et al. |
| 9,558,306 | B2 | 1/2017 | Narayanaswamy et al. |
| 9,576,092 | B2 | 2/2017 | Platzker et al. |
| 10,225,051 | B1 | 3/2019 | Kuo et al. |
| 2016/0350468 | A1* | 12/2016 | Chiu .................... G06F 30/343 |
| 2020/0380188 | A1 | 12/2020 | Macrae et al. |
| 2021/0383046 | A1 | 12/2021 | Prasad et al. |
| 2023/0034736 | A1 | 2/2023 | Singh et al. |
| 2023/0053664 | A1 | 2/2023 | Hauzi et al. |
| 2023/0334207 | A1 | 10/2023 | Macrae et al. |
| 2023/0367939 | A1 | 11/2023 | Prasad et al. |
| 2024/0386173 | A1 | 11/2024 | Baumgartner et al. |

FOREIGN PATENT DOCUMENTS

| | | | |
|---|---|---|---|
| TW | 202113654 | A | 4/2021 |
| TW | I788768 | B | 1/2023 |
| TW | 202312004 | A | 3/2023 |
| TW | 202447464 | A | 12/2024 |
| TW | I881687 | B | 4/2025 |

OTHER PUBLICATIONS

H. Cheng, X. Li, Y. Gu and P. A. Beerel, "Converting Flip-Flop to Clock-Gated 3-Phase Latch-Based Designs Using Graph-Based Retiming," in IEEE Transactions on Computer-Aided Design of Integrated Circuits and Systems, vol. 41, No. 4, pp. 979-992, Apr. 2022, doi: 10.1109/TCAD.2021.3068109.

Albrecht, A.R., Hu, A.J. (2001). "Register Transformations with Multiple Clock Domains," In: Margaria, T., Melham, T. (eds) Correct Hardware Design and Verification Methods. Charme 2001. Lecture Notes in Computer Science, vol. 2144. Springer, Berlin, Heidelberg. https://doi.org/10.1007/3-540-44798-9_11.

Kuehlmann, A., Baumgartner, J. (2001). "Transformation-Based Verification Using Generalized Retiming." In: Berry, G., Comon, H., Finkel, A. (eds) Computer Aided Verification. CAV 2001. Lecture Notes in Computer Science, vol. 2102. Springer, Berlin, Heidelberg. https://doi.org/10.1007/3-540-44585-4_10.

K. Eckl and C. Legl, "Retiming sequential circuits with multiple register classes," Design, Automation and Test in Europe Conference and Exhibition, 1999. Proceedings (Cat. No. PR00078), 1999, pp. 650-656, doi: 10.1109/DATE.1999.761198.

C. Leiserson, and J. Saxe, "Retiming synchronous circuitry," Algorithmica (1991) 6:5-35.

A. P. Hurst, A. Mishchenko and R. K. Brayton, "Scalable min-register retiming under timing and initializability constraints," 2008 45th ACM/IEEE Design Automation Conference, 2008, pp. 534-539, doi: 10.1145/1391469.1391604.

A. P. Hurst, A. Mishchenko and R. K. Brayton, "Fast Minimum-Register Retiming via Binary Maximum-Flow," Formal Methods in Computer Aided Design (FMCAD'07), 2007, pp. 181-187, doi: 10.1109/FAMCAD.2007.31.

"List of IBM Patents or Patent Applications Treated As Related," for U.S. Appl. No. 18/318,555, filed May 16, 2023.

Taiwan Patent Office, Office Action for Taiwan Patent Application No. 113103277, dated Sep. 30, 2024.

Taiwan Patent Office, "Notice of Allowance," Mar. 24, 2025, 12 Pages, TW Application No. 113103277.

Taiwan Patent Office, "Notice of Allowance," Nov. 27, 2025, 12 Pages, TW Application No. 113103289.

* cited by examiner

100

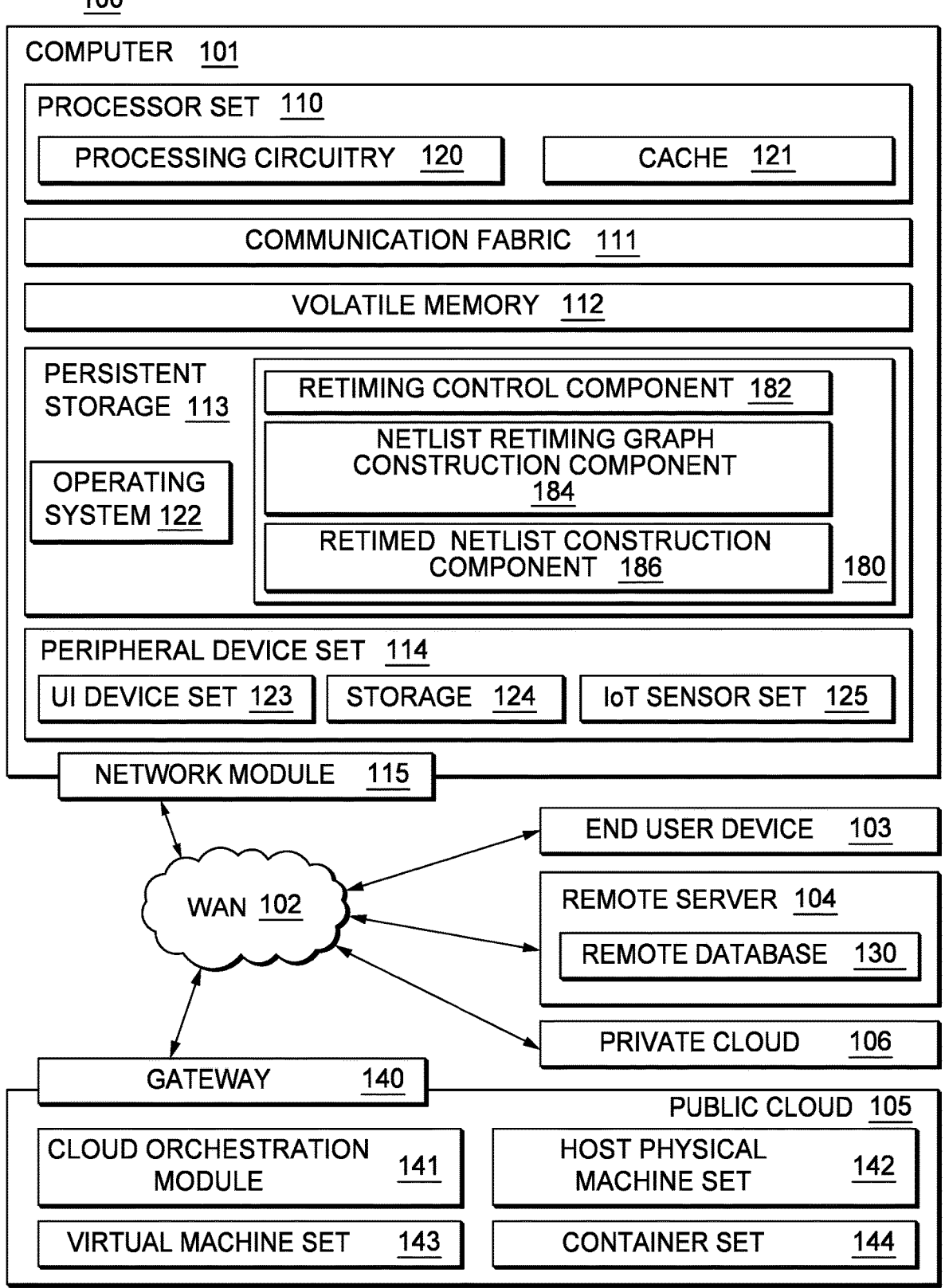

COMPUTER   101

PROCESSOR SET   110

PROCESSING CIRCUITRY   120      CACHE   121

COMMUNICATION FABRIC   111

VOLATILE MEMORY   112

PERSISTENT STORAGE   113

RETIMING CONTROL COMPONENT   182

NETLIST RETIMING GRAPH CONSTRUCTION COMPONENT   184

RETIMED  NETLIST CONSTRUCTION COMPONENT   186

OPERATING SYSTEM 122

180

PERIPHERAL DEVICE SET   114

UI DEVICE SET   123      STORAGE   124      IoT SENSOR SET   125

NETWORK MODULE   115

WAN 102

END USER DEVICE   103

REMOTE SERVER   104

REMOTE DATABASE   130

PRIVATE CLOUD   106

GATEWAY   140

PUBLIC CLOUD 105

CLOUD ORCHESTRATION MODULE   141

HOST PHYSICAL MACHINE SET   142

VIRTUAL MACHINE SET   143

CONTAINER SET   144

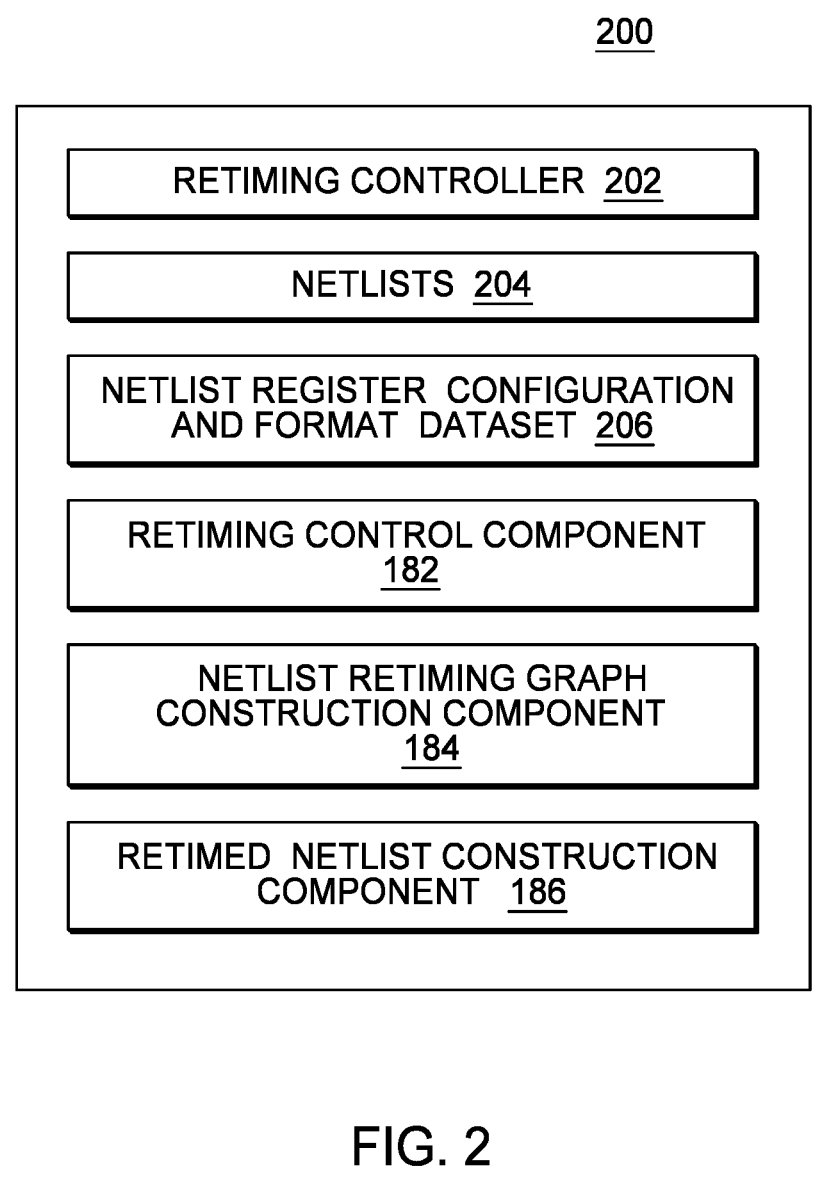

RETIMING CONTROLLER 202

NETLISTS 204

NETLIST REGISTER  CONFIGURATION
AND FORMAT  DATASET 206

RETIMING CONTROL COMPONENT
182

NETLIST RETIMING GRAPH
CONSTRUCTION COMPONENT
184

RETIMED  NETLIST CONSTRUCTION
COMPONENT  186

FIG. 2

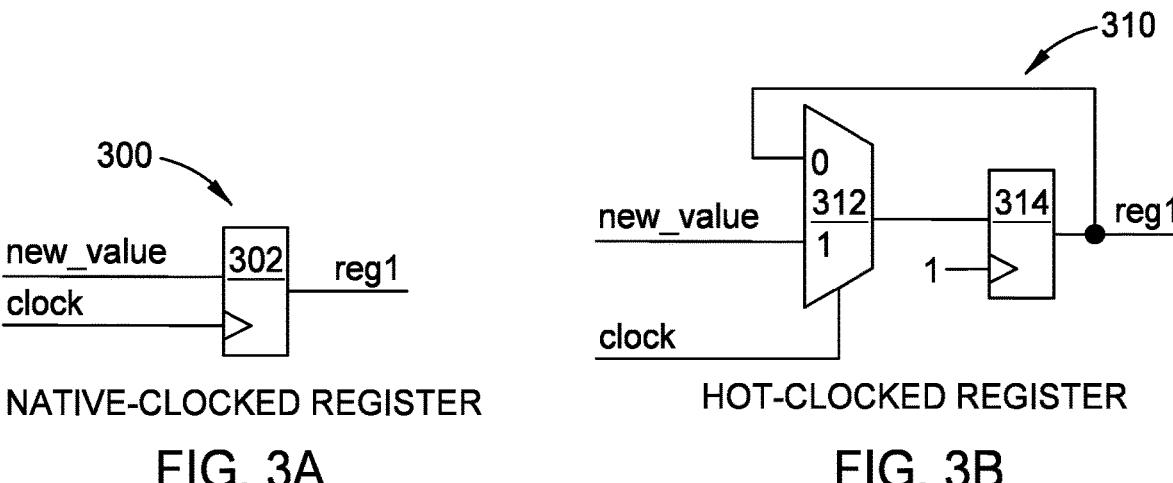
NATIVE-CLOCKED REGISTER
FIG. 3A
HOT-CLOCKED REGISTER
FIG. 3B
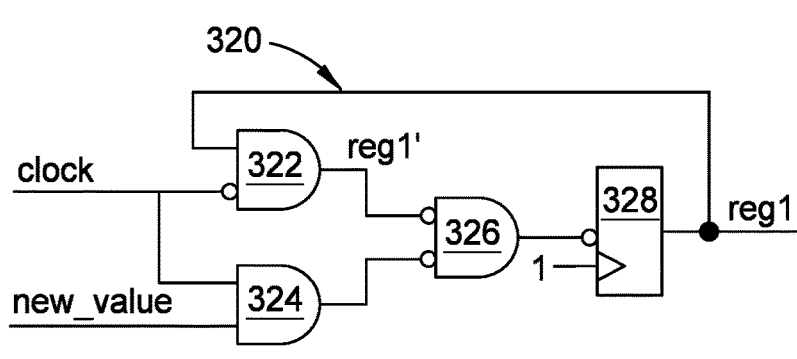
HOT-CLOCKED REGISTER AIG
FIG. 3C
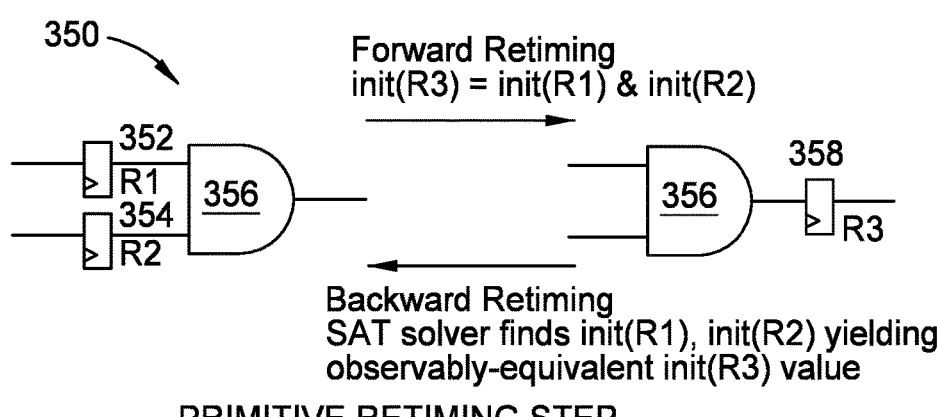
Forward Retiming
init(R3) = init(R1) & init(R2)
Backward Retiming
SAT solver finds init(R1), init(R2) yielding
observably-equivalent init(R3) value
PRIMITIVE RETIMING STEP
FIG. 3D

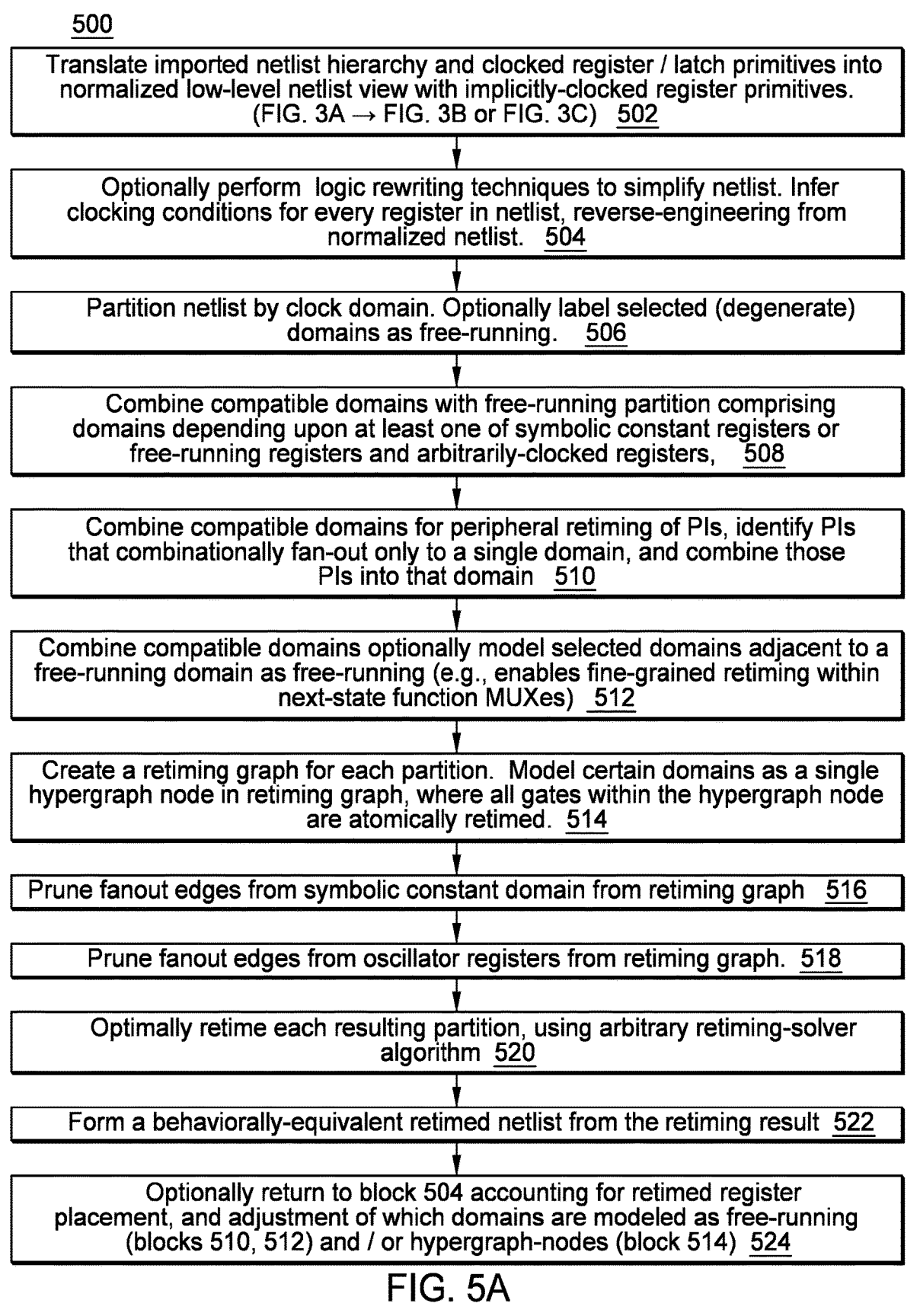

500

Translate imported netlist hierarchy and clocked register / latch primitives into normalized low-level netlist view with implicitly-clocked register primitives. (FIG. 3A → FIG. 3B or FIG. 3C)   502

Optionally perform logic rewriting techniques to simplify netlist. Infer clocking conditions for every register in netlist, reverse-engineering from normalized netlist.   504

Partition netlist by clock domain. Optionally label selected (degenerate) domains as free-running.   506

Combine compatible domains with free-running partition comprising domains depending upon at least one of symbolic constant registers or free-running registers and arbitrarily-clocked registers,   508

Combine compatible domains for peripheral retiming of PIs, identify PIs that combinationally fan-out only to a single domain, and combine those PIs into that domain   510

Combine compatible domains optionally model selected domains adjacent to a free-running domain as free-running (e.g., enables fine-grained retiming within next-state function MUXes)   512

Create a retiming graph for each partition. Model certain domains as a single hypergraph node in retiming graph, where all gates within the hypergraph node are atomically retimed.   514

Prune fanout edges from symbolic constant domain from retiming graph   516

Prune fanout edges from oscillator registers from retiming graph.   518

Optimally retime each resulting partition, using arbitrary retiming-solver algorithm   520

Form a behaviorally-equivalent retimed netlist from the retiming result   522

Optionally return to block 504 accounting for retimed register placement, and adjustment of which domains are modeled as free-running (blocks 510, 512) and / or hypergraph-nodes (block 514)   524

FIG. 5A

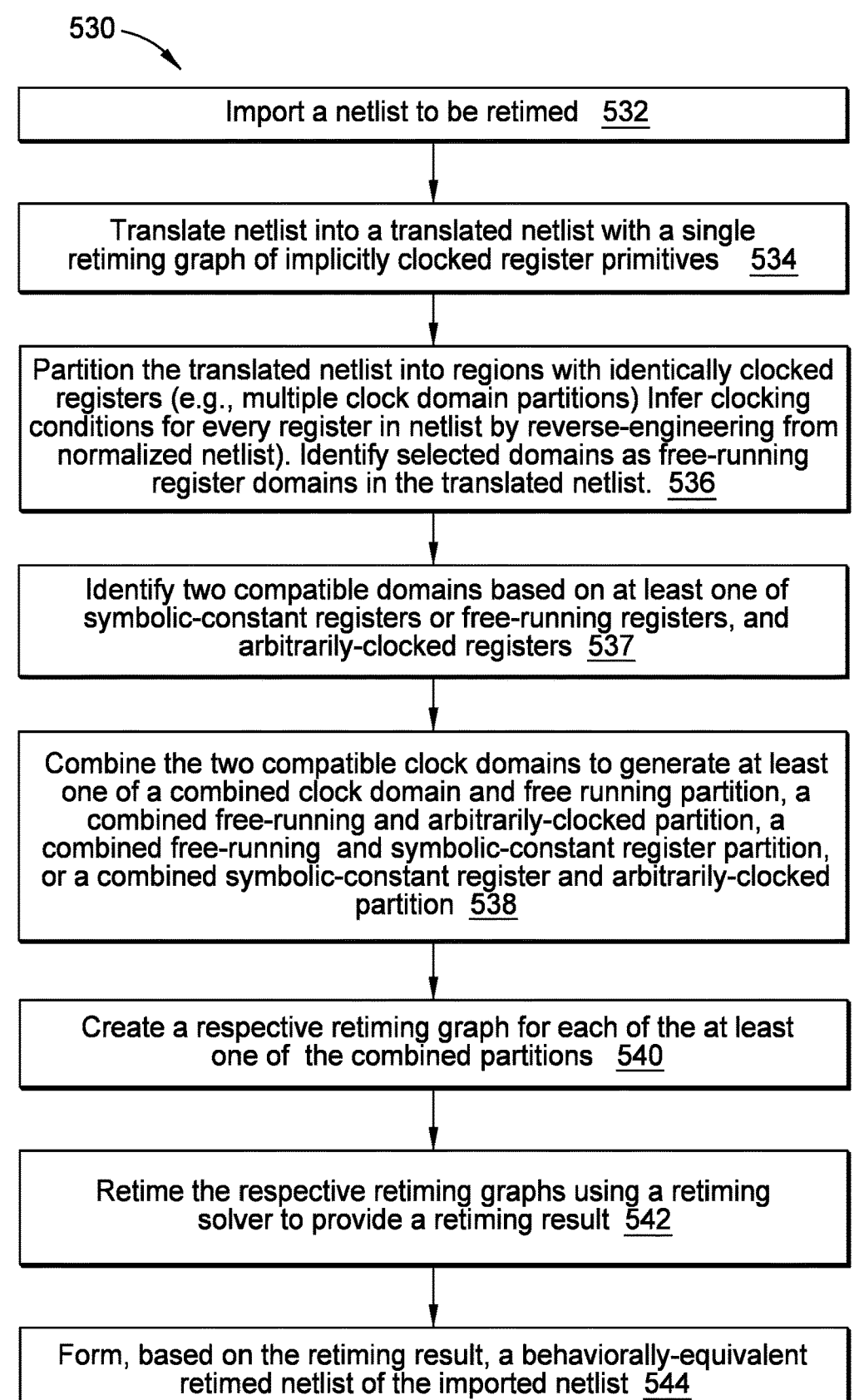

530

Import a netlist to be retimed  532

Translate netlist into a translated netlist with a single retiming graph of implicitly clocked register primitives  534

Partition the translated netlist into regions with identically clocked registers (e.g., multiple clock domain partitions) Infer clocking conditions for every register in netlist by reverse-engineering from normalized netlist). Identify selected domains as free-running register domains in the translated netlist.  536

Identify two compatible domains based on at least one of symbolic-constant registers or free-running registers, and arbitrarily-clocked registers  537

Combine the two compatible clock domains to generate at least one of a combined clock domain and free running partition, a combined free-running and arbitrarily-clocked partition, a combined free-running  and symbolic-constant register partition, or a combined symbolic-constant register and arbitrarily-clocked partition  538

Create a respective retiming graph for each of the at least one of  the combined partitions  540

Retime the respective retiming graphs using a retiming solver to provide a retiming result  542

Form, based on the retiming result, a behaviorally-equivalent retimed netlist of the imported netlist  544

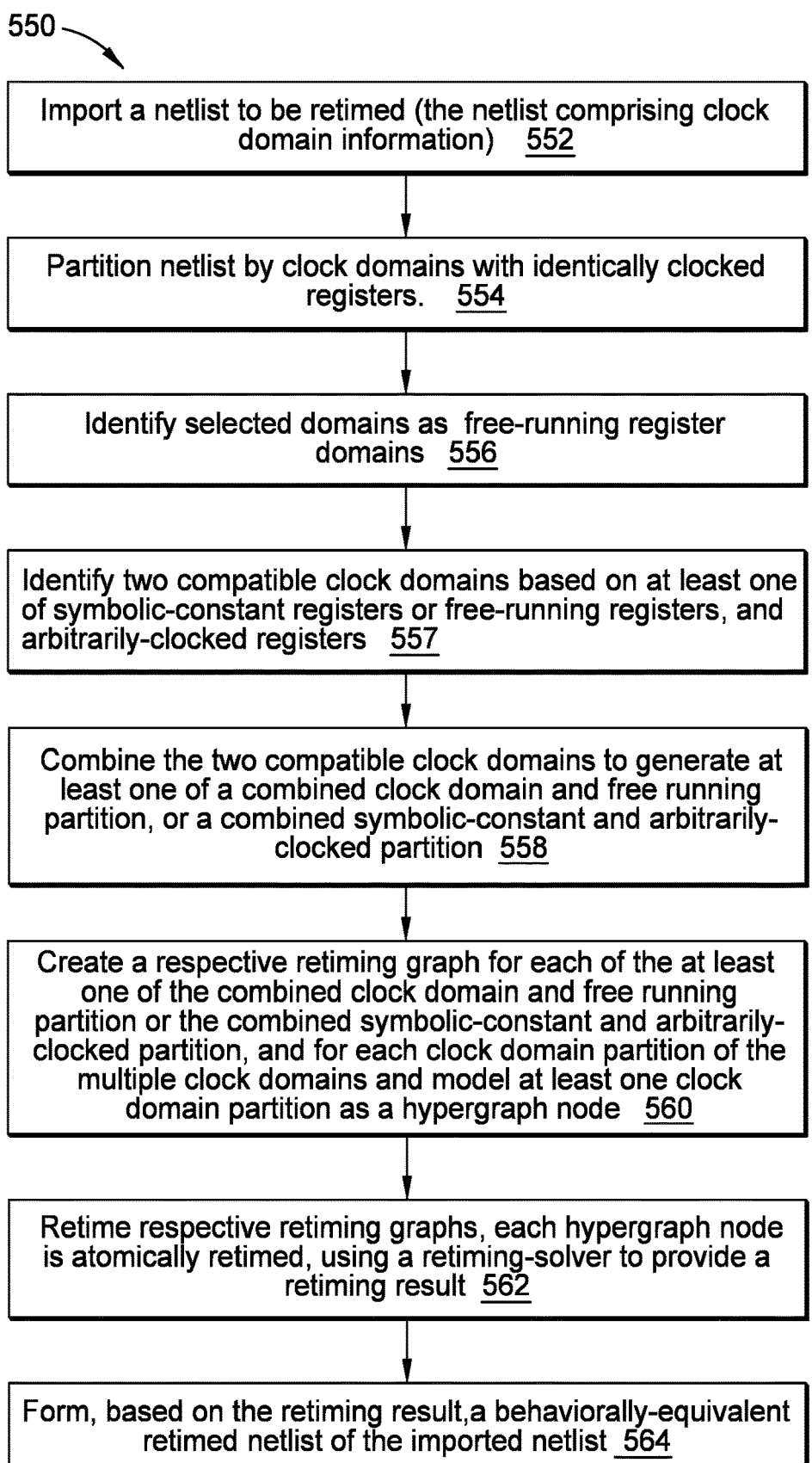

Import a netlist to be retimed (the netlist comprising clock domain information) 552

Partition netlist by clock domains with identically clocked registers. 554

Identify selected domains as free-running register domains 556

Identify two compatible clock domains based on at least one of symbolic-constant registers or free-running registers, and arbitrarily-clocked registers 557

Combine the two compatible clock domains to generate at least one of a combined clock domain and free running partition, or a combined symbolic-constant and arbitrarily-clocked partition 558

Create a respective retiming graph for each of the at least one of the combined clock domain and free running partition or the combined symbolic-constant and arbitrarily-clocked partition, and for each clock domain partition of the multiple clock domains and model at least one clock domain partition as a hypergraph node 560

Retime respective retiming graphs, each hypergraph node is atomically retimed, using a retiming-solver to provide a retiming result 562

Form, based on the retiming result, a behaviorally-equivalent retimed netlist of the imported netlist 564

Enhanced Hybrid Domain-Based Retiming Algorithm 0. function optimal_partition_and_retime_netlist(Netlist N) {
1.    expand clocked registers to normalized-MUX view ( FIG.3A-FIG.3B→ FIG. 3C) with free-running clocks
2.    optionally run logic-optimization techniques to put MUX-expanded view in more-normalized form
3.    Initialize muxInternal(*) = false; notMuxInternal(*) = false;
4.    foreach register R { // Initial register-coloring, and muxInternal-marking to fine-tune domain- vs free-running-based retiming
5.      mark_combinational_fanin(initial_state(R), notMuxInternal, true) // treat initial_state logic as "observable"
6.      if(M = identify_mux_from_aig(next_state(R), R) is non-NULL) { // try to reverse-engineer next-state function of R as a MUX
7.         foreach MUX-internal gate G of M.Mux_Internal_Gates
8.            muxInternal(G) = true // mark each gate implementing mux M as muxInternal
9.         color(R) = M.clock // temporarily mark color of R; might be fine-tuned later
10.   }
11.   else {
12.      color(R) = {ONE} // treat R as free-running
13.      mark_combinational_fanin(next_state(R), notMuxInternal, true)
14.   }
15. }

16. foreach netlist "output" O { // iterate primary outputs, targets, constraints
17.    mark_combinational_fanin(O, notMuxInternal, true) // these gates cannot be suppressed from retiming-graph
18. }

19. foreach register R {
20. if(R.color != {ONE}) { // previously-identified domain register
21. if((notMuxInternal(next_state(R)) == true) || (muxInternal(next_state(R)) == false)) { //
next-state MUX cannot be suppressed from retiming graph, due to visibility by other gates
22. R.color = {ONE} // treat R as free-running
23. mark_combinational_fanin(next_state(R), notMuxInternal, true)
24.   }

```
25.    else {
26.       if(R.processed) continue // speedup
27.       Netlist P = subcircuit of N adjacent to R with identical R.color
28.       foreach gate p in P {p.processed = true} // speedup
29.       if(P has only 1 register) { // if partition is too small, convert to free-
running. can optionally be configurable, "if P has <= N registers"
30.          R.color = {ONE} // no value in domain-retiming; treat as free-running
31.          mark_combinational_fanin(next_state(R), notMuxInternal, true)
32.       }
33.    }
34.    }
35.  }
36.    for each gate G // now propagate colors through combinational logic
37.       color_fanout(G) // color each gate as the set of colors of registers in its
combinational fanin
38.    for each register R { // finally, perform retiming
39.       if(R.retimed) continue
40.       Netlist P = subcircuit of N adjacent to R with identical R.color
41.       if(R.color != {ONE}) {
42.          mark R.color as "retiming-graph sink" // cannot domain-retime across a
clock
42A.          domain_retime(P, R.color) // perform traditional retiming on uniformly-
colored partitions, suppressing MUX and clock logic
43.    }
44.       else domain_retime(P, ONE) // freerun-retime
45.       P.retimed = true;
46.  }
47.    optionally convert netlist back to clocked-register representation (FIG. 3C
→ FIG. 3A or FIG. 3B)
48.}
```

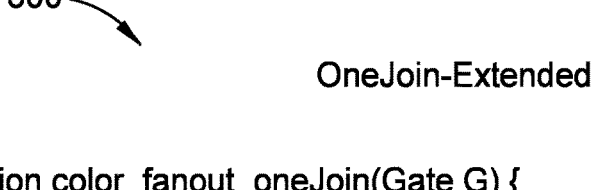

OneJoin-Extended color_fanout() Algorithm

```
function color_fanout_oneJoin(Gate G) {
   if(color(G) is set) {return color(G)}
   if(G is a register)  color(G) = {G.clock} // each register is colored as per its
clock
   else if(G is a RANDOM gate)  {color(G) = ONE} // for peripheral retiming, treat
RANDOMs as color ONE
   else {
      Set C = {} // empty set
      for each gate g1 sourcing an input edge to G {
         color_fanout_oneJoin(g1)
         C = C union color(g1)
      }
      if(C includes ONE and another color) { // oneJoin root gate
         push(OneJoinRoots, G)
         color(G) = {ONE}  // ensure fanouts see only color ONE
      }
      else color(G) = C
   }
}
```

OneJoin-Extended domain_retime() Algorithm

```
domain_retime_oneJoin(Sub-Netlist P, color C, queue OneJoinRoots) { //
identical to domain_retime() until "OneJoin addition" comment
   RetimingGraph B = create "retiming graph" from P: all "inputs" to P sourced
by a differently-colored gate (in N but not in P) become "sources", all
"outputs" of P with a fanout sink to a differently-colored gate become "sinks"
   retiming_solve(B)   // compute the optimal retiming result for this retiming
graph, using arbitrary retiming-algorithm
   foreach lagged register S in P { // remove original registers
      if(C == {ONE}) replace the source of each output edge from S by
next_state(S) // not a clocked register
      else replace the source of each output edge from S by new_value(S) as per
FIG.3A // clocked register
   } foreach retimed-register location at output of gate G { // lagged "sinks", or
lagged internal gates with lesser-lagged fanout edges within P
      if(C == {ONE}) inject a free-running register r1 between G and its sinks; G is
its next-state function
      else inject a clocked register r1 with clock==C between G and its sinks; G is
its new_value (FIG.3A)
      replicated(G) = replicate the logic cone between G and its original fanin
registers, sourcing that replicated logic by the initial_value's of those original
fanin registers
      set initial_value(r1) = replicated(G)
   }

// OneJoin addition
   foreach lagged gate S within P {
      if S is in OneJoinRoots { // properly model this gate to yield a behaviorally-
equivalent retimed netlist
         for each gate g1 sourcing an input edge to S {
            if(color(g1) != {ONE}) {// Recall that OneJoinRoots are marked with
color=={ONE}; these differently-colored fanin gates are outside P
               duplicated(g1) = replicate combinational logic cone from g1 to the
retimed-registers r1* in its combinational fanin; source that replicated cone by
the next-state function MUX condition of those r1* registers
               replace g1's fanout edge to S by a fanout edge from duplicated(g1)
         }
      }
   }
}
```

Hierarchical, Hybrid Domain-Based Retiming Algorithm

```
1. function hierarchical_retime_netlist(Netlist N) {
2.   color and partition netlist as per FIGS. 6A,6B lines 2-36, calling FIG. 8 on line
37 (omitting "perform retiming" step - customized below)
3.   RetimingGraph B = {empty graph}
4.   foreach register R {
5.     if(exported(R)) continue
6.     Netlist P = subcircuit of N adjacent to R sharing color(R)
7.     foreach gate G in P  {partition(G) = P; exported(G) = true}  // associate G
uniquely with its partition
8.     if(color(R) == {ONE}) {create gates and edges from P 1:1 in B} // traditional
RetimingGraph conversion
9.     else { // create hyper-graph node for this domain-partition
10.      create node(P) as a hyper-graph node within B
11.      foreach gate G in P with input sourced by a gate outside of P
12.        add edge from node(partition(G)) to node(P) within B // if delay-based
retiming is done, info about the latency of this wire may be added to the
corresponding edge in B
13.    }
14.  }
15. retiming_solve(B)  // compute the optimal retiming result for this retiming
graph, using arbitrary retiming-algorithm. Note that every gate in B will be treated
as free-running C=={ONE}
16. foreach lagged node L in B {
17.   R = any register within retiming-graph L
18.   if(retimed(R)) continue
19.   P = partition(R)
20.   foreach gate G in P {retimed(G) = true}
21.   retime P as a free-running partition with computed lag
21. }
22.}
```

Figure 11:
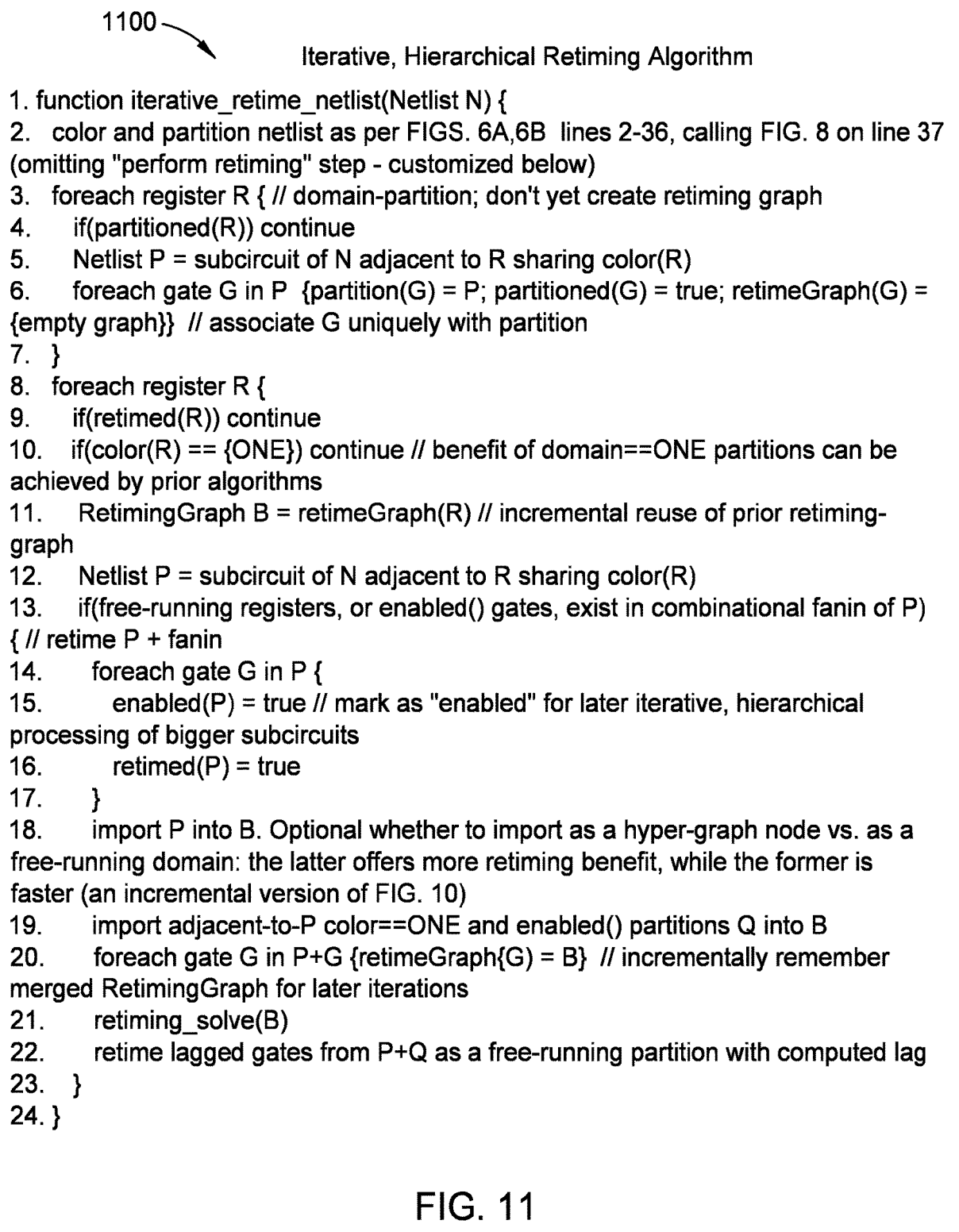

Iterative, Hierarchical Retiming Algorithm 1. function iterative_retime_netlist(Netlist N) {
2.   color and partition netlist as per FIGS. 6A,6B  lines 2-36, calling FIG. 8 on line 37 (omitting "perform retiming" step - customized below)
3.   foreach register R { // domain-partition; don't yet create retiming graph
4.     if(partitioned(R)) continue
5.     Netlist P = subcircuit of N adjacent to R sharing color(R)
6.     foreach gate G in P  {partition(G) = P; partitioned(G) = true; retimeGraph(G) = {empty graph}} // associate G uniquely with partition
7.   }
8.   foreach register R {
9.     if(retimed(R)) continue
10.    if(color(R) == {ONE}) continue // benefit of domain==ONE partitions can be achieved by prior algorithms
11.    RetimingGraph B = retimeGraph(R) // incremental reuse of prior retiming-graph
12.    Netlist P = subcircuit of N adjacent to R sharing color(R)
13.    if(free-running registers, or enabled() gates, exist in combinational fanin of P) { // retime P + fanin
14.      foreach gate G in P {
15.        enabled(P) = true // mark as "enabled" for later iterative, hierarchical processing of bigger subcircuits
16.        retimed(P) = true
17.      }
18.      import P into B. Optional whether to import as a hyper-graph node vs. as a free-running domain: the latter offers more retiming benefit, while the former is faster (an incremental version of FIG. 10)
19.      import adjacent-to-P color==ONE and enabled() partitions Q into B
20.      foreach gate G in P+G {retimeGraph{G} = B} // incrementally remember merged RetimingGraph for later iterations
21.      retiming_solve(B)
22.      retime lagged gates from P+Q as a free-running partition with computed lag
23.    }
24. }

Zero- and One-Join-Extended color_fanout() Algorithm

```
function color_fanout_zeroOneJoin(Gate G) {
  if(color(G) is set) {return color(G)}
  if(G is a register) {color(G) = {G.clock} // each register is colored as per its clock
  else if(G is a RANDOM gate) {color(G) = {ONE} // for peripheral retiming, treat
RANDOMs as color ONE
  else {
    Set C = {empty set}
    for each gate g1 sourcing an input edge to G {
      color_fanout_zeroOneJoin(g1)
      C = C union color(g1)
    }
    if(C is a singleton color) {color(G) = C}
    else {
      if(C contains ZERO) {
        prune ZERO from C
        foreach color=={ZERO} gate g1 sourcing an input edge to G
{push(ZeroRoots, g1)}
      }
      if(C includes ONE and another color) { // oneJoin root gate
        push(OneJoinRoots, G);
        color(G) = {ONE}  // ensure fanouts see only color ONE
      }
      else color(G) = {C};
    }
  }
}
```

ZeroClock-Extended domain_retime() Algorithm

```
domain_retime_zeroClock(Sub-Netlist P, color C, queue ZeroRoots, bool
RemapInitialValues) {
    MinCutGraph M = import (color=={ZERO}) gates as nodes, and interconnections
between those gates as edges  // use min-cut graph, which allows more-optimal
solution than retimingGraph
    M.sources = original (color=={ZERO}) register nodes within M
    M.sinks = ZeroRoots nodes within M
    minCut MC = minCut_solve(M)
    OrigZeroRegs = original (color=={ZERO}) registers
    foreach lagged register r1 in OrigZeroRegs {remove r1: replace fanout edges
from r1 to fanout edge to initial_value(r1)}
    foreach min-cut gate g1 in MC {
      inject a (color=={ZERO}) retimed register r1 at the fanout of g1: fanout edges
from g1 become fanout edges of r1
      push (RetimedZeroRegs, r1)
      set initial_value(r1) = g1
      if(RemapInitialValues) { // in Design and Synthesis applications, it may be
desirable to map selection between original OrigZeroRegs initial values and
RetimedZeroRegs initial values, to update configuration register database
        for each RANDOM valuation used to select among a set of configuration-
register initial-values of OrigZeroRegs) {
          oSim = simulate values at OrigZeroRegs under that RANDOM valuation
          rSim = simulate values at new MC registers under that RANDOM valuation
          report mapping of RANDOM valuation (the configuration), from <OrigRegs,
oSim> to <RetimedZeroRegs, rSim>
      }
    }
}
```

ColorRandoms Algorithm, Enabling Domain-Lagging of RANDOM Gates

```
function color_fanin(Gate G, color D) {
  Set C = faninColor(G)
   if(D is not a subset of C) {
    C = C union D
    faninColor(G) = C
    if(G is not a register)
      for each gate g1 sourcing an input edge to G
        color_fanin(g1, C)
} colorRandoms(Netlist N) {
  foreach gate G {faninColor(G) = {empty set}}
  foreach register R {
    if(color(R) != {ONE} && color(R) != {ZERO}) {
      color_fanin(R.new_value, R.clock)
      color_fanin(R.clock, ONE)  // clocks are always marked with color ONE
    }
    else {color_fanin(next_state(R), ONE)}
    color_fanin(initial_value(R), ONE) // initial values always marked with color
ONE
  } foreach netlist "output" O // iterate primary outputs, targets, constraints
    color_fanin(initial_value(R), ONE) // outputs marked with color ONE foreach RANDOM gate G {
    if(faninColor(G) is a singleton set) {
      color(G) = faninColor(G)
    }
  }
}
```

Trace Lifting Algorithm for Domain-Lagged RANDOM Gates

```
function liftTrace(retimed-Netlist retN, retimed-Trace retTrace)
   liftedTrace = populate values to non-domain-lagged gates from retTrace
   // E.g. unclocked gates g1 are copied to liftedTrace with time-shift=lag of g1.
   // Top-level Verification process can simulate liftedTrace on original Netlist to fill
in remaining values, except for domain-lagged RANDOMs which need the
following consideration:

Set RandomClocks = {clocks (colors) of domain-lagged RANDOM gates in retN}
   simulateTrace(retN, retTrace,  RandomClocks) // populate Boolean values to
RandomClocks within retTrace foreach domain-lagged RANDOM gate G {
   lastValue = {unknown}
   foreach time-step t1 from 0 .. retTrace.length {
      if(retTrace[G.clock, t1] == 1) { //  G's clock is asserted this time-step t1
         lastValue = retT[G, t1]  // remember this value to reuse until next G.clock
assertion
      }
      if(lastValue != {unknown})
         liftedTrace[G, t1] = lastValue
      // else leave undefined
   }
}
```

FIG. 15

SCALABLE, OPTIMAL RETIMING OF MULTI-CLOCKED NETLISTS

BACKGROUND

The present invention relates to the integrated circuit design field, and more specifically to retiming of multi-clocked netlists of integrated circuit (IC) designs.

Retiming is a well-known design optimization used to reduce the number of state-holding elements (latches or registers) in a netlist and/or reducing combinational-path latency by relocating state-holding elements across combinational gates. Reducing register count (min-area retiming) is useful in Design and Synthesis, enabling power and area reductions. Many verification algorithms suffer run-time degradation proportional to register count, potentially exponentially so. Min-area retiming is also very useful to improve Verification scalability with the resulting reduced register count. Equivalence-checking can also benefit from the ability to put a sequential netlist in a more canonical form; independent of its original topology, this itself can trivialize some sequential equivalence checking problems. Reducing combinational-path latency (min-delay retiming) is useful in Design and Synthesis to enable higher clock frequencies. Practically, in Design and Synthesis of a given Integrated Circuit (IC) design, it is often desirable to achieve a balance between both area and delay (delay-constrained min-area retiming). Basically, delay-constrained min-area retiming can yield a min-area retiming which does not violate the desired clock frequency.

In one traditional retiming method, an entire netlist is converted to a low-level design representation such as And/Inverter Graph (AIG) where registers are free-running, meaning that their clocking and next-state function logic is synthesized into multiplexor logic, and a single bit-level synthesized next-state function defines the value held by the register in the next time-step. Monolithic retiming is then performed on this low-level netlist representation. In another retiming method, the registers may remain clocked elements as declared in a design's Hardware Description Language (HDL), and domain-based retiming may be performed within each identical-clock-domain partition. Both methods have strengths and weaknesses, and each method can yield different reductions.

Various algorithms have been proposed to solve a min-area retiming problem, including Integer Linear Program (ILP) solvers; a simplex algorithm (or simplex method) to solve an ILP problem; and a modified min-cut, max-flow algorithm. These algorithms have super-linear yet polynomial runtime, and can consume significant runtime, (i.e., several hours on very-large netlists.) Constrained min-area retiming can be implemented by augmenting a min-area retiming system with additional constraints, reflecting delay information.

Given the broad value of retiming (impacting Design, Synthesis, and Verification), there remains a significant need for techniques that can improve the Quality of Result (area, power, delay) or design quality of retiming (e.g., yielding additional register-reductions for min-area retiming), while preserving design behavior and importantly that can improve runtime of retiming.

A need exists for new techniques to effectively and efficiently implement enhanced retiming and improve integrated circuit (IC) design quality, and reduced retiming runtime and that can overcome some deficiencies of traditional retiming systems and that can provide improved retimed netlists not possible with traditional retiming systems.

SUMMARY

Embodiments of the present disclosure implement enhanced retiming of multi-clock netlists and improve integrated circuit (IC) design quality and enhanced retiming runtime.

A non-limiting disclosed method comprises importing a netlist for a given integrated circuit (IC) design; the netlist comprising multiple clock domains. A retiming system translates the imported netlist into a translated netlist having a retiming graph of implicitly clocked register primitives. The retiming system partitions the netlist into regions with identically clocked registers to create a clock domain partition and a free-running partition for each of the multiple clock domains. The system identifies two compatible clock domains based on at least one of: (i) symbolic-constant registers or (ii) free-running registers, and arbitrarily-clocked registers. The retiming system combines the two compatible clock domains to generate at least one of a combined clock domain and free running partition, a combined arbitrarily-clocked and free-running partition, a combined free-running and symbolic-constant register partition, or a combined arbitrarily-clocked and symbolic-constant register partition. The retiming system creates a respective retiming graph for each of the least one of the combined clock domain and free running partition, the combined arbitrarily-clocked and free-running partition, the combined free-running and symbolic-constant register partition, or the combined arbitrarily-clocked and symbolic-constant register partition. The retiming system retimes the respective retiming graphs using a retiming solver to provide a retiming result. The retiming system forms, based on the retiming result, a behaviorally equivalent retimed netlist of the imported netlist.

The above method provides hybrid domain-based and free-running retiming of a multiple clock domain netlist yielding retimed netlist quality and yielding significant speedup of retiming runtime over traditional retiming.

Another non-limiting computer implemented method comprises retiming the respective retiming graphs using a retiming solver, identifying a hypergraph node in a partition-retiming graph, and atomically retiming all gates within the hypergraph node.

Another non-limiting computer implemented method comprises identifying peripheral inputs having combinational fanout only to registers of a single clock-domain. The system combines the inputs into the single-clock-domain and provides the identified inputs and combinational logic between the inputs and the registers of the single clock-domain into a single-clock-domain netlist partition.

Another non-limiting computer implemented method comprises combining compatible domains with a free-running partition, based upon clock domains with free-running registers and arbitrarily-clocked registers, and based upon clock domains with symbolic-constant registers and arbitrarily-clocked registers. The retiming system computes a min-cut between an original symbolic-constant register location and sink logic, where the min-cut comprises a symbolic-constant register input source and a symbolic-constant register output sink.

Other disclosed embodiments include a computer control system and computer program product for implementing enhanced retiming of multi-clock netlists, implementing features of the above-disclosed methods.

BRIEF DESCRIPTION OF THE DRAWINGS

FIG. 1 is a block diagram of an example computer environment for use in conjunction with one or more disclosed embodiments for implementing enhanced retiming;

FIG. 2 is a block diagram of an example system for implementing enhanced retiming of one or more disclosed embodiments;

FIG. 3A schematically illustrates an example native clocked register netlist representation supported by one or more disclosed embodiments;

FIG. 3B schematically illustrates an example hot-clocked register netlist representation supported by one or more disclosed embodiments;

FIG. 3C schematically illustrates an example hot-clocked register (AIG) netlist representation supported by one or more disclosed embodiments;

FIG. 3D schematically illustrates a primitive retiming step of one or more disclosed embodiments;

FIG. 5A is a flow chart of an example operations of an example method for implementing enhanced retiming of one or more disclosed embodiments;

FIG. 5B is a flow chart of an example method for implementing enhanced retiming of one or more disclosed embodiments;

FIG. 5C is a flow chart of another example method for implementing enhanced retiming of one or more disclosed embodiments;

FIGS. 6A and 6B illustrate example pseudo code for an enhanced Hybrid Domain-Based Retiming Algorithm for implementing enhanced retiming of one or more disclosed embodiments;

FIG. 8 illustrates example pseudo code for an example OneJoin Extended color_fanout ( ) Algorithm for implementing enhanced retiming of one or more disclosed embodiments;

FIG. 9 illustrates example pseudo code for an example OneJoin-Extended domain_retime ( ) Algorithm for implementing enhanced retiming of one or more disclosed embodiments;

FIG. 10 illustrates example pseudo code for an example Hierarchical, Hybrid Domain-Based Retiming Algorithm for implementing enhanced retiming of one or more disclosed embodiments;

FIG. 11 illustrates example pseudo code for another example Iterative, Hierarchical Retiming Algorithm for implementing enhanced retiming of one or more disclosed embodiments;

FIG. 12 illustrates example pseudo code for an example Zero- and One-Join-Extended color_fanout ( ) Algorithm for implementing enhanced retiming of one or more disclosed embodiments;

FIG. 13 illustrates example pseudo code for an example ZeroClock-Extended domain_retime ( ) Algorithm for implementing enhanced retiming of one or more disclosed embodiments;

FIG. 14 illustrates example pseudo code for an example ColorRandoms Algorithm, Enabling Domain-Lagging of RANDOM Gates for implementing enhanced retiming of one or more disclosed embodiments; and FIG. 15 illustrates example pseudo code for an example Trace-Lifting Algorithm for Domain-Lagged RANDOM Gates for implementing enhanced retiming of one or more disclosed embodiments.

DETAILED DESCRIPTION

Figure 4A:
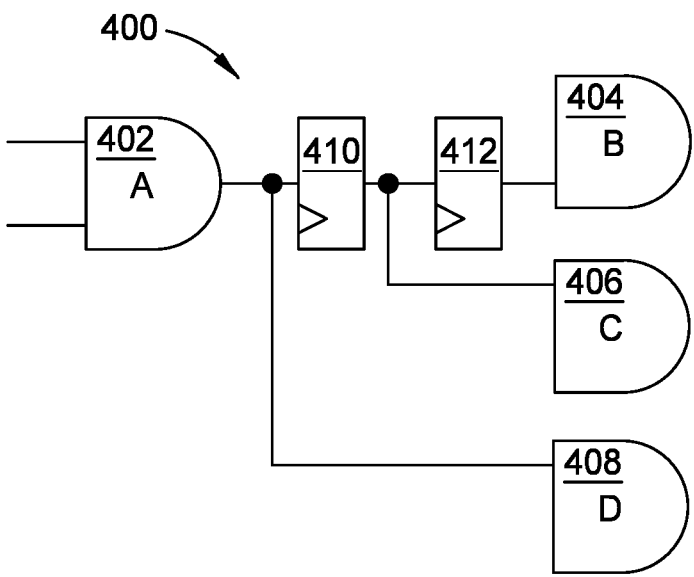
FIG. 4A schematically illustrates an example fanout register sharing supported by one or more disclosed embodiments.

Problems of existing retiming systems include inherent limitations of retiming for reducing the possible number of state-holding elements (latches or registers) in a given netlist including reducing combinational-path latency and the significantly large time consumed for retiming runtime. Embodiments of the present disclosure provide new effective and efficient techniques for implementing enhanced retiming of multi-clock domain netlists yielding significant speedup of retiming runtime over traditional retiming systems.

Embodiments of the disclosure provide systems and methods to implement enhanced retiming of multi-clock domain netlists avoiding the generally extreme runtime of traditional retiming arrangements. An improved disclosed method and retiming system can perform hierarchical, hybrid domain-based and free-running retiming of a multi-clock-domain netlist providing enhanced retiming of the multi-clock netlists yielding significant speedup of retiming runtime over traditional retiming. A disclosed method comprises translating an imported netlist into a translated netlist, such as a normalized netlist format with implicitly clocked register primitives. The normalized netlist format provides a netlist design representation such as And/Inverter Graph where registers are free-running, meaning that their clocking and next-state function logic is synthesized into multiplexor logic, and a single bit-level synthesized next-state function defines the value held by the register in the next time-step. In disclosed embodiments, the retiming system identifies selected clock domains (e.g., degenerate domains) as free-running domains. The retiming system partitions the netlist into regions with identically clocked registers for example, reverse engineering from the imported netlist to infer clocking conditions for every register. In disclosed embodiments, the system identifies two compatible clock domains based on at least one of: (i) symbolic-constant registers or (ii) free-running registers, and arbitrarily-clocked registers, or (iii) selected clock domains adjacent to a free-running domain. The retiming system can combine the two compatible clock domains to generate at least one of a combined clock domain and free-running partition, a combined arbitrarily-clocked partition and free-running partition, a combined free-running partition and symbolic-constant register partition, or a combined arbitrarily-clocked partition and symbolic-constant register partition. For example in disclosed embodiments, retiming system can combine compatible domains depending upon both free-running registers and symbolic-constant registers and arbitrarily-clocked registers with a free-running partition. The retiming system can combine compatible domains with a free-running partition, for example, based upon selected clock domains adjacent to a free-running domain, where the selected clocked domains and the adjacent free-running domain have identically clocked registers (i.e., the same clock domain of the multiple clock domains). The retiming system creates a retiming graph for each resulting clock domain partition and free-running partition and retimes the retiming graph for each resulting partition in a single run using a retiming solver to provide a retiming result. The retiming system forms a behaviorally equivalent retimed netlist from the retiming result. The method provides smaller retiming graphs with the partitioning without sacrificing netlist quality, yielding significant speedup of retiming runtime over traditional retiming.

In a disclosed embodiment, the retiming system optionally performs traditional logic rewriting to simplify the normalized low-level netlist format (e.g. redundancy removal, and/or other logic rewriting to reduce gate-count). The retiming system analyzes the simplified normalized low-level netlist to infer clocking conditions of registers, reverse engineering from the registers representations and next-state functions to an original imported netlist. The method provides domain-based retiming reductions from the normalized low-level netlist format effective for low-level verification and enables obtaining retiming results of both free running and domain-based retiming, efficiently using the created retiming graph. This method provides effective and efficient retiming without sacrificing netlist quality, yielding significant speedup of retiming runtime over traditional retiming.

Another non-limiting method optimally retimes multiple domain gates in a fanout of a clocked domain and a free-running domain. This method allows a multiple domain traditionally unretimeable fanout to be retimed in the same partition as its free-running fanin, while requiring precise retimed-netlist construction.

Another non-limiting method optimally retimes symbolic constant register domains, and multiple domain gates in a fanout of symbolic constant register domain and other domains. This method enables design retiming to allow the reduction of a number of latches, gates, and wire-length of symbolic constant register domains.

Another non-limiting iterative, hybrid method yields optimal retiming results on small retiming-graphs by selectively modeling domain-partitions as free running and/or as a single hypergraph node. Each hypergraph node is atomically retimed; (i.e., retimed one at a time, executed completely or not at all).

Disclosed embodiments provide methods to yield higher-quality netlists via Peripheral Retiming with borrowing and discarding registers from peripheral or primary inputs/primary outputs (PIs/POs). Peripheral Retiming comprises identifying PIs having combinational fan-out only to a single clock domain, allowing those PIs to borrow a clocked register to enable domain-retime versus free-running retime a PI, and combining the PIs into the single domain. The PIs and combinational logic between the PIs and the single clock domain registers are combined into a single clock domain netlist partition and optimal peripheral retiming of that partition is performed. When Peripheral Retiming is used in a Verification toolset, reforming the retimed netlist uses waveform traces obtained on the retimed netlist to repeat valuations of forward-retimed inputs between assertions of the single clock domain.

Disclosed embodiments of Peripheral Retiming allow POs to be domain-retimed during Verification of safety properties. Peripheral Retiming includes identifying safety property gates in a combinational fanout of registers of a single clock domain and backward retiming any of the safety property gates, allows the safety gates to borrow a register from the safety property gate having the same clock as the single clock domain, and having an initial value that cannot falsify the safety property. Peripheral Retiming ensures retimed netlist captures full Verification problem semantics, for example when used in semi-formal verification or simulation.

Disclosed embodiments provide optimizations for speed and netlist quality. A disclosed retiming graph construction includes for example pruning or suppressing output edges from a symbolic constant register domain and other domains, suppressing output edges from global-clocks and oscillator registers. Such operations yield improved retiming runtime over traditional retiming.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to the invention shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as Retiming Control Component 182, Netlist Retiming Graphs Construction Component 184, and Retimed Netlist Construction Component 186 at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located off chip. In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as the inventive methods). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the disclosure provide systems and methods to implement enhanced retiming of multi-clock domain netlists to avoid a typical runtime of traditional retiming arrangements. One or more disclosed methods and retiming systems perform hybrid domain-based and free-running retiming of a multi-clock-domain netlist providing enhanced retiming of multi-clock netlists yielding significant speedup of retiming runtime over traditional retiming. In a disclosed embodiment, the timing system translates an imported netlist for an integrated circuit design into a normalized low-level netlist format with implicitly-clocked register primitives. The normalized low-level netlist format provides a netlist design representation such as And/Inverter Graph (AIG) where registers are free-running, meaning that their clocking and next-state function logic is synthesized into multiplexor logic, and a single bit-level synthesized next-state function defines the value held by the register in the next time-step. A disclosed retiming system identifies selected clock domains as free-running domains, and partitions the netlist into regions with identically-clocked registers. The retiming system combines compatible domains with a free-running partition, for example, based upon selected clock domains adjacent to a free-running domain, where the selected clocked domains and the adjacent free-running domain have identically clocked registers (i.e., the same clock domain of the multiple clock domains). The disclosed retiming system creates a retiming graph for each resulting domain based and free-running partition and retimes the retiming graph for each resulting partition in a single run using a retiming solver to provide a retiming result. The retiming system forms a behaviorally equivalent retimed netlist from the retiming result. The method provides smaller retiming graphs (e.g., that are retimed in a single run) for each partition without sacrificing netlist quality, yielding significant speedup of retiming runtime over traditional retiming.

Embodiments of the present disclosure provide new effective and efficient techniques for implementing enhanced retiming of multi-clock domain netlists to provide behaviorally equivalent retimed netlists, avoiding the generally extreme runtime of traditional retiming arrangements yielding significant speedup of retiming runtime over traditional retiming systems. In a disclosed embodiment, the retiming system optionally performs traditional logic rewriting to simplify the normalized low-level netlist format (e.g. redundancy removal, and/or other logic rewriting to reduce gatecount.) The retiming system analyzes the simplified normalized low-level netlist to infer clocking conditions of registers, reverse engineering from the registers representations and next-state functions of the original imported netlist. The method provides domain-based retiming reductions from the normalized low-level netlist format effective for low-level verification netlist and enables obtaining retiming results of both free running and domain-based retiming, efficiently using the created retiming graph. The method provides effective and efficient retiming without sacrificing netlist quality, yielding significant speedup of retiming runtime over traditional retiming.

FIG. 2 illustrates a retiming system 200 for implementing enhanced retiming of multi-clock netlists of one or more disclosed embodiments. System 200 can be used in conjunction with the computer 101 and cloud environment of the computing environment 100 of FIG. 1 for implementing enhanced retiming of multi-clock netlists providing improved integrated circuit (IC) design quality and enhanced retiming runtime.

System 200 includes a retiming controller 202, netlists 204 and a netlist register configuration and format dataset 206 to implement enhanced retiming of multi-clock netlists of disclosed embodiments. System 200 imports a netlist 204 for the given circuit design for implementing enhanced retiming of the multi-clock netlist to provide a retimed netlist of disclosed embodiments. Netlist register configuration and format dataset 206 stores netlist syntax and register configuration data, such as synthesized register multiplexor and next-state function data for a given netlist 204.

System 200 includes the Retiming Control Component 182, Netlist Retiming Graph Construction Component 184, and Retimed Netlist Construction Component 186, shown in FIG. 1 of disclosed embodiments. Retiming Control Component 182 can be used for example with the retiming controller 202 and with computer 101, for implementing enhanced retiming of multi-clock netlists in accordance with disclosed embodiments. Netlist Retiming Graph Construction Component 184 may be used with the retiming controller 202 to create a respective retiming graph for each of the domain-based partitions, and free-running partitions of disclosed embodiments.

An integrated circuit design to be retimed by the disclosed retiming system 200 is represented by an imported netlist 204 comprising multiple clocks. A given netlist 204 can comprise a directed graph with nodes representing gates, and edges representing wires (or nets or signals) between those gates. In the netlist 204, gates have associated functions, such as constants, primary inputs (referred to as RANDOM gates), combinational logic such as AND gates, and sequential elements (latches or registers). For example, FIGS. 3A, 3B, and 3C illustrate example netlist formats such as an example AND/Inverter Graph (AIG) shown in FIG. 3C, where combinational gates are simple two-input AND gates, and inversions are implicit attributes on edges. Generally, a netlist 204 can support arbitrary gate types with an arbitrary number of input and output pins, for example, adders, multiplexors, and clocked registers. Each netlist 204 has a defined format, where each netlist formal supports a fixed but arbitrary set of gate types. Typically in netlists 204 for a design-compilation flow for Synthesis or for Verification, the netlists begin with higher-level gates, for example vectored multiplexors and adders. Then during the compilation or model build flow, the netlists 204 can be decomposed to smaller, simpler gates to allow finer-grained optimizations.

Netlists 204 generally include latches and registers in Hardware Description Language that may have one or more clocks, each with an associated next-state function. Latches and registers also have an associated initial value, defining their time=0 behavior. The registers may have a time=i+1 behavior that is defined by the values of their clocks and next-state functions at time=i. FIGS. 3A, 3B, and 3C illustrate different example clocked-register netlist representations supported by the disclosed embodiments.

FIG. 3A schematically illustrates a native clocked register netlist representation 300 supported by one or more disclosed embodiments having one explicit clocked register 302. As shown, the register 302 receives two inputs, one clock input, clock, and one next-state function input, new_value, and provides an output driving signal reg1. A next time=i+1 value or next (reg1) is a function of clock, new_value, and reg1 at time=I, for example next (reg1)=if (clock==1) then new_value, else reg1.

FIG. 3B schematically illustrates a hot-clocked register netlist representation 310 supported by one or more disclosed embodiment. In FIG. 3B, the illustrated hot-clocked register netlist representation 310 provides a functionally equivalent version of the clocked register 302. As shown, the hot-clocked register netlist representation 310 includes a multiplexor 312 (or MUX) and a register 314. The MUX 312 includes 0 and 1 inputs; the 1 input of MUX 312 receives the next-state function new_value. The register 314 provides its output reg1 to the 0 input of MUX 312, and the MUX 312 receives clock input clock. The illustrated hot-clocked register netlist representation 310 is a free-running register, meaning that its clock has been replaced by constant=ONE (reg1 will update every time-step); the decision of whether to propagate new_value or hold the prior reg1 value is synthesized into the multiplexor 312 at the register's next-state function.

FIG. 3C schematically illustrates a hot-clocked register AND/Inverter Graph (AIG) netlist representation 320 supported by one or more disclosed embodiments. FIG. 3C shows another functionally equivalent version of the clocked register 302 of FIG. 3A, and the hot-clocked register netlist representation 310 of FIG. 3B. The example hot-clocked register AIG 320 includes a plurality (three versions) of AND gates 322, 324, 326 and a register 314, as shown. In FIG. 3C, the MUX 312 in FIG. 3B is synthesized into the gates 322, 324, 236 of AND/Inverter Graph (AIG). The function of reg1 in FIG. 3C is next (reg1)=! (! (clock & new_value) &! (!clock & reg1)). In the AND/Inverter Graph format, MUXes may alternatively be represented as next (reg1)=! (clock &!new_value) &! (!clock &!reg1). Different netlist formats of a Hardware Description Language (HDL) latch or register may have a preferred netlist representation 300, 310 or 320 of FIGS. 3A, 3B, and 3C. It is generally possible to transition netlist syntax among these variants, if the netlist format supports the corresponding gate types.

Level-sensitive latches and edge-sensitive registers may be synthesized into the normalized single clock register netlist representation Multi-clock registers may also be synthesized into the single-clock netlist representation In the following description, a normalized view of sequential elements can comprise registers with a single clock and next-state function. A configuration register (or chicken-switch register) refers to a symbolic constant register whose next-state function is itself; such a register unconditionally holds its initial value forever. As an arbitrary convention, chicken-switches are considered as having clock==ZERO and next_state==reg1 in the normalized netlist representation.

In Verification of a given design, the netlist 204 is often a composition of a logical design under test, a synthesis of the properties under verification, and a synthesis of input assumptions or a driver, where this composition is often called a testbench. In Equivalence Checking, the testbench may include two different versions of a logical design.

A trace is a set of Boolean valuations to netlist gates over time, consistent with the netlist's semantics. Traces are relevant in Verification, and generally are useful ways to identify the behavior of netlist gates. In Verification, certain gates may be labeled targets or constraints. Some targets correlate to safety properties, where the goal of Verification is to find a counterexample trace showing the safety-target gate asserted to a logical one, or to prove that no such assertion of the target gate is possible. Some targets may correlate to liveness properties, where the goal of Verification is to find a counterexample trace showing the liveness target remaining asserted to one forever, or alternatively to prove that the liveness target cannot remain asserted forever. Some constraints may be safety constraints that must evaluate to one in every time-step of any trace considered as a counterexample to falsify a target. Some constraints may be fairness constraints, used to restrict counterexample traces for liveness targets. For example, any counterexample trace for a liveness target must show that each fairness gate can evaluate to one. Thus, a counterexample trace used to falsify a liveness target cannot show a fairness gate remains deasserted forever.

FIG. 3D schematically illustrates an example primitive retiming step 350 supported by one or more disclosed embodiments. Generally in retiming, a forward retiming step (negative lagging) relocates a register from all inputs of a combinational gate to its outputs. A backward retiming step relocates all outputs of a gate to its inputs, (positive lagging). As shown in FIG. 3D, the illustrated forward retiming relocates a pair of registers 352, 354 R1 and R2 from the inputs of a combinational AND gate 356 to its output as a retimed register 358 R3. Forward retiming is only possible if a register is present at, or can be relocated to, each input of that gate. Globally optimal retiming can include iteratively applying retiming steps across combinational gates until optimality is achieved for a given netlist. Note that each original combinational gate correlates uniquely to a gate of the same function in the retimed netlist, only register placement is adjusted between the original and retimed netlist.

For brevity, novel disclosed techniques in the following description are described for forward retiming. Techniques of disclosed embodiments are also applicable to backward retiming, by considering fanout-to-fanin instead of fanin-to-fanout edges, and by replacing sources with sinks; i.e. by reversing the direction of the retiming graph.

In traditional retiming context, the lag of a gate refers to the number of clock periods that gate's behavior was delayed by retiming. Considering a trace for an original netlist, and a retimed_trace obtained by simulating the same input sequence on a retimed netlist, the behavior of an original gate in trace is guaranteed to be identical to the behavior of the corresponding retimed gate in the retimed_trace, modulo being time-shifted by its lag. For this reason, retiming preserves the behavior of every unlagged gate.

Peripheral retiming refers to allowing registers to be borrowed or discarded from input or output pins of a netlist. In a contest of Synthesis or Design, these are the primary input and output pins, respectively. In a Verification context, inputs are referred to as RANDOM gates, and outputs are the targets and constraints of the testbench. Peripheral retiming can alter input/output behavior of a netlist in specific ways, e.g., altering the number of pipeline stages between inputs and outputs. Synthesis typically requires input/output behavior of the netlist to be preserved, using equivalence checking to confirm that Synthesis did not alter the behavior of the design. For this reason, peripheral retiming is rarely used in Synthesis, though it can be a useful technique to achieve runtime benefits in Verification, and can be used in design-space exploration, e.g., to consider relocating registers across a unit boundary.

Generally retiming is unable to alter the register-count along any directed cycle in the netlist. This is because individual retiming steps can only alter where, along a directed-cycle; the retimed registers will be located. Other Synthesis transforms such as state machine re-encoding or redundancy removal are able to alter register-count within cyclic logic while preserving input/output behavior. Overall, retiming is just one of many Synthesis techniques used in state-of-the-art tools.

Because retiming is unable alter register-count along any directed cycle, if retiming the netlist 320 of FIG. 3C, the self-loop for!clock guarantees that reg1 will either remain at its current location, or move inside the MUX at the output of the!clock AND-gate depicted as reg1'. Retiming cannot relocate this register completely outside the MUX structure, even if this MUX structure is retimed. This fact historically prevents applications such as Formal Verification (model-checking, sequential-equivalence checking) from achieving register reductions of clock-gated latches through retiming. Such applications often use a low-level netlist format such as AND/Inverter Graph 320 as illustrated in FIG. 3C. Regardless of the final retimed-register location of reg1 at its current location or at reg1', by retiming this clocked-register logic it might be possible to achieve register reductions in undisplayed logic adjacent to this clocked-register. For example, if undisplayed logic includes an AND gate with reg1 and other un-clock gated registers on its input pins, by forward retiming this AND gate could globally reduce register count of those other undisplayed registers. To achieve those reductions via retiming requires forward-retime reg1 itself, pushing this original register along its clock-MUX, back to its original location, or to reg1'.)

To retime a netlist, a retiming graph is created from a given netlist graph, recording a mapping from netlist graph nodes (gates) to retiming-graph nodes. An arbitrary retiming algorithm is used to compute an optimal retiming result on that retiming graph (e.g., a min-cut based retiming algorithm or an ILP based retiming algorithm). Finally, when an optimal retiming result is available for that retiming graph, a retimed netlist is created using the retiming result, mapped to the original netlist gates. For example, by analyzing which retiming graph nodes were lagged (time delayed), a retiming system can determine how far an original register should be forward retimed to arrive in its final optimal location in the retimed netlist. With And/Inverter Graph type retiming (i.e., free-running retiming) without inferring clock domains (domain-based retiming), the retiming graph can be nearly a 1:1 representation of the netlist graph; possibly suppressing unretimeable gates, such as those gates with RANDOM gates in their combinational fanin if not allowing peripheral retiming.

Fanout register sharing is commonly used, allowing a retimed register placed at the output of a gate to be shared by multiple fanouts of that gate, for example as illustrated in FIG. 4A.

FIG. 4A schematically illustrates example fanout register sharing netlist representation 400 supported by one or more disclosed embodiments. As shown, the example fanout register sharing netlist representation 400 includes AND gates 402 A, 404 B, 406 C, and 408 D and a pair of retimed registers 410, 412. The illustrated example fanout register sharing 400 is commonly used, allowing a retimed register (i.e., register 410) placed at the output of a gate, (i.e., the AND gate 402 A) to be shared by multiple fanouts (to register 412 and AND gate 406 C) of that gate, as shown. In FIG. 4A, the two output edges from AND gate 402 A (to AND gates 404 B and 406 C) share the register 410; only the output edge to AND gate 404 B samples the register 412. Different fanouts may have different lags; the difference between the lag of a gate, and the lag of a fanout gate, represents the number of retimed registers injected along that edge.

In some netlist formats, for example some netlist formats used in Synthesis, registers can have explicit clocks. In traditional domain based retiming clocked registers can be relocated as follows. First, the netlist can be partitioned into sub-graphs containing identical single-clock registers. Second, an optimal register placement can be computed within each single-clock partition by suppressing clock edges in the retiming-graph for that partition, and only model edges from register-output reg1 to next-state new_value as shown FIG. 3A. Then an optimal retiming result can be computed on the partition's retiming graph, using any desired retiming algorithm. When creating the retimed netlist for this partition, the partition's unique clock is applied to any retimed registers within the partition. Boundaries between incompatible domains (i.e. gates which have registers of different clocks in their combinational fanin) must generally be blocked from domain based retiming, because there is generally no behaviorally equivalent retimed netlist that can be formed by retiming clocked registers with two different clock signals across a single gate. As a result, such multi-clocked regions are never actually retimed; only single-clock partitions are retimed by traditional domain based retiming.

Figure 4B:
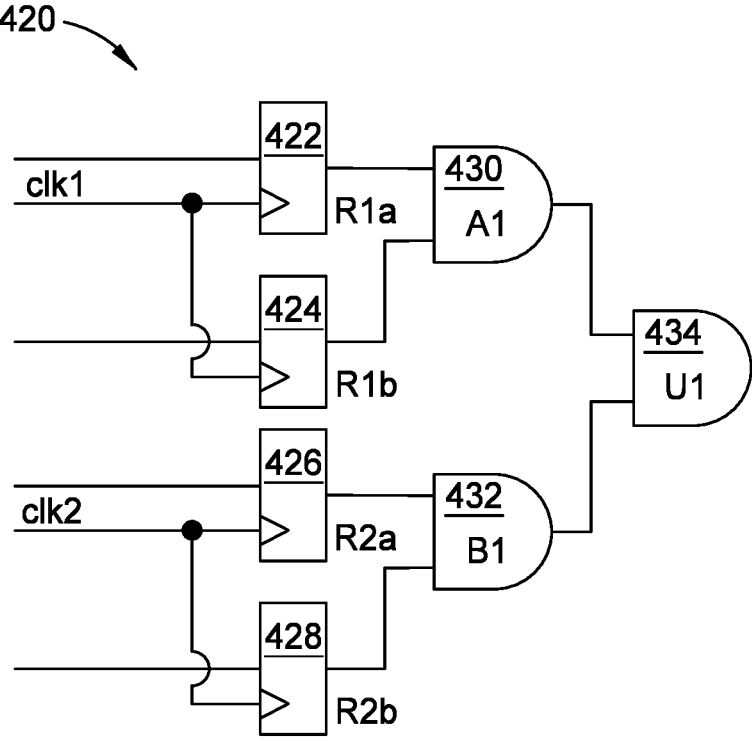
FIG. 4B schematically illustrates an example netlist with two different clock domains of multi-domain retiming supported by one or more disclosed embodiments.

FIG. 4B schematically illustrates an example netlist 420 with two different clock domains clk1, clk2 of multi-domain retiming supported by one or more disclosed embodiments. A pair of registers 422, R1a and 424, R1b, shares clock clk1. A pair of registers 426, R2a and 428, R2b, shares clock clk2. AND gate 430, A1 and AND gate 432, B1 in the netlist 420 have respective inputs from registers 422, R1a and 424, R1b, and registers 426, R2a and 428, R2b. The AND gate 430, A1 and AND-gate 432, B1 are inputs to AND gate 434, U1. Respective register and gates are labeled or designated according to a given clock or clock domain of multiple clock domains in the netlist. For example, each of the multiple clocks and clock domains are represented by a different clock color, which is correspondingly used for the clock domain designation of respective registers and gates, referred to as coloring the registers and gates, (e.g. in a color_fanout ( ) function.) By coloring the gates, AND gate 430, A1 and AND gate 432, B1 in the netlist 420 by the clock of registers in their combinational fanin; the netlist can be partitioned by color, i.e., by different clock domains clk1, clk2. AND-gate 430, A1 with R1a and R1b are in one color domain, i.e., color (clk1); and AND-gate 432, B1 with registers 426, R2a and 428, R2b are in another color domain, i.e., color (clk2). Domain-based retiming can forward-retime 422, R1a and 424, R1b across AND gate 430 to reduce register count by one. Domain-based retiming independently can forward retime registers 426, R2a and 428, R2b across AND gate 432, B1 to reduce the register count by one. AND-gate 434, U1 receives inputs of two colors (i.e., two different clocks or clock domains), and thus must be blocked from domain-based retiming. It is noteworthy that with domain-based retiming, when reducing register-count via retiming a clocked register, additionally reducing gate-count of combinational logic can be provided with subsequently transforming the domain-retimed netlist to free-running representation (i.e., modeling FIG. 4B with register next-state functions explicitly as shown in FIG. 3B and FIG. 3C). This can result because fewer clocked registers entails fewer multiplexors to represent their explicitly modeled next-state functions.

However, when using a free-running representation of the netlist 420 of FIG. 4B (i.e., modeling register next-state functions explicitly as with FIG. 3B and FIG. 3C), it is possible to retime across U1 and the entire subcircuit or netlist 420. This sometimes can yield register reductions adjacent to clocked subcircuits by allowing free-running based retiming, and also improving upon free-running retiming, and thus enhanced retiming as illustrated and described with respect to example methods of FIGS. 5A, 5B, and 5C and example pseudo-code of disclosed algorithms of FIGS. 6A, 6B, and FIGS. 8-11. The following Table 1 offers example pseudo-code for traditional domain-based retiming.

TABLE 1

Traditional Synthesis Domain-Based Retiming Example

```
function color_fanout(Gate G) { // colors propagate from fanin (recursion-termination
points) to fanouts
    if(G.color is non-empty) {return}
    if(G is a register) G.color = {G.clock} // each register is colored as per its pre-
defined clock
    else if(G is a RANDOM gate) G.color = {ONE} // for peripheral retiming, treat
RANDOMs as color ONE, enabling borrowing of "ungated" registers
    else {
      Set C = { } // empty set
      for each gate g1 sourcing an input edge to G {
        color_fanout(g1)
        C = C union {g1.color}
      }
      G.color = C
    }
}
function domain_retime(Sub-Netlist P, color C) {
    RetimingGraph B = create retiming-graph from P: all "inputs" to P sourced by a
differently colored gate (in N but not in P) become "sources", all "outputs" of P with a
fanout sink to a differently-colored gate become "sinks." Multi-colored gates are omitted
from the retiming graph. These sources and sinks effectively partition into sub-graphs
    retiming_solve(B) // compute an optimal retiming result for this retiming graph, using
an arbitrary retiming-algorithm
    foreach lagged register S in P { // remove original registers
      if(C == {ONE}) replace the source of each output edge from S by next_state(S) // not
a clocked register
      else replace the source of each output edge from S by new_value(S) as per FIG. 3A //
clocked register
    }
    foreach retimed-register location at output of gate G { // lagged "sinks", or lagged
internal gates with lesser-lagged fanout edges within P
    if(C == {ONE}) inject a free-running register r1 between G and its sinks; G is its next-
state function
    else inject a clocked register r1 with clock=C between G and its sinks; G is its
new_value (FIG. 3A)
    replicated(G) = replicate logic cone between G and its original fanin registers, sourcing
that replicated logic by the initial_value's of those original fanin registers
    set initial_value(r1) = replicated(G)
    }
}
function partition_and retime_netlist(Netlist N) {
    for each gate G
    color_fanout(G) // color each gate as the set of colors of registers in its combinational
fanin for each register R {
      if(R.retimed) continue // already computed
      Netlist P = subcircuit of N adjacent to R with identical R.color
      domain_retime(P, R.color) // perform traditional retiming on uniformly-colored
partitions
      P.retimed = true;
    }
}
``` registers to be relocated across clocked partitions. With free-running retiming, registers 422, R1a, 424, R1b 426, R2a and 428, R2b will remain locked at their current location or within the MUX regardless of lagging. It is thus the case that domain-based and free-running retiming yield complementary reductions.

In traditional domain-based retiming used in Synthesis, the registers are pre-defined netlist gates having explicit clocks and next-state functions. Synthesis will strictly adhere to those pre-defined objects, never altering clocks or next-state functions to yield different domain-partitioning.

Features of the disclosed embodiments provide methods and various functions improving upon traditional domain- Function domain_retime(P, color) is an existing Synthesis algorithm for example used to perform a desired type of retiming (min-area, min-delay, or constrained min-area) on a sub-netlist P, with a desired algorithm to solve a given retiming problem, for example ILP based retiming or min-cut based retiming. Once the new retimed-register locations have been determined, the retimed netlist can be constructed by eliminating each lagged original register, and inserting retimed registers at the appropriate locations. For example, the retimed registers locations are directly at the output of either a pre-declared lagged retiming sink gate such as primary-output if not doing peripheral retiming; a lagged partition sink which is a gate in P with a fanout-edge crossing outside the local sub-netlist P to another differently-colored gate in N; or a lagged gate within P that has a fanout gate with smaller lag.

The following traditional helper functions in Table 2 are provided only for completeness. The traditional helper functions can be implemented in one or more disclosed methods, which can improve traditional domain-based retiming, and enable enhanced retiming as illustrated and described with respect to FIGS. 6A, 6B, FIG. 7 and FIGS. 8-11 of disclosed embodiments.

TABLE 2

Traditional Helper Functions of Synthesis Domain-Based Retiming Example

```
function mark_combinational_fanin(Gate G, markType flag, markValue value) {
  if(flag(G) == value) return // G is already marked with the desired value
  if(G is combinational) {
    flag(G) = value
    for each gate g1 sourcing an input edge to G {
      mark_combinational_fanin(g1, flag, value)
    }
  }
}
function <bool mux_identified, Gate clock, Gate new_value, Set Mux_Internal_Gates>
identify_mux_from_aig(Gate G, Gate reg1) { // Check if "G" (register reg1's next-state
function) has a MUX form, where one data-input is "reg1"
  if(G has form "!(!(clock & new_value) & !(!clock & reg1))" or form "!(clock &
!new_value) & ! (!clock & !reg1))", where new_value and clock are different than reg1)
  {
    return <MUX_FOUND, clock, new_value, {G, left_child(G), right_child(G)}>;
  }
  if(G has form "!(!clock & !reg1)") { // new_value is constant==ONE
    return <MUX_FOUND, clock, ONE, {G}>
  }
  if(G has form "(!clock & reg1)") { // new_value is constant==ZERO
    return <MUX_FOUND, clock, ZERO, {G}>
  }
  if(G == reg1) { // chicken-switch: clock is constant == ZERO
    return <MUX_FOUND, ZERO, reg1, { }>
  }
  return NULL
}
```

System 200 including the Retiming Control Component 182, Netlist Retiming Graph Construction Component 184, and Retimed Netlist Construction Component 186 can be used with the retiming controller 202 and computer 101, for implementing a retiming method 500 in accordance with disclosed embodiments.

FIG. 5A illustrates an example method 500 for implementing enhanced retiming of one or more disclosed embodiments. The method 500 provides domain-based retiming reductions, for example, using a normalized low-level netlist format effective for low-level verification. The method 500 enables obtaining retiming results of both free-running and domain-based retiming, efficiently creating a behaviorally equivalent netlist from the retiming result of disclosed embodiments.

Referring also to FIGS. 6A and 6B, example pseudo illustrates an enhanced Hybrid Domain-Based Retiming Algorithm 600 of one or more disclosed embodiments to enable implementing enhanced retiming of the method 500.

In a disclosed embodiment, as indicated at block 502, system 200 optionally translates an imported netlist hierarchy and clocked register/latch primitives into a normalized netlist representation with implicitly-clocked register primitives, as provided at a first line of the pseudo code of FIG. 6A. For example, see netlist representation 300 of FIG. 3A translated to the netlist representation 310 of FIG. 3B or the netlist representation 320 of FIG. 3C. At block 504, system 200 optionally performs traditional logic rewriting techniques to simplify the translated netlist (e.g. redundancy removal, and/or other logic rewriting to reduce gate-count.) System 200 analyzes the simplified netlist (e.g., simplified normalized low-level netlist) to infer clocking conditions of recognizable registers from the register representations and next-state functions based on the original imported netlist (e.g., optionally using the Netlist register configuration and format dataset 206).

At block 506, system 200 partitions the netlist by clock domain. As described with respect to FIG. 4B the netlist can be partitioned by clock domain, where registers are represented or designated by different colors corresponding to clock domain, (i.e., different clock domains, such as one clock domain clk1; and another clock domain clk2). Note the pseudo code block beginning at line 4 in FIG. 6A, where registers R are assigned an initial register-coloring. Optionally system 200 labels or models selected (e.g., degenerate) domains as free running as shown at block 506. At block 508, system 200 combines compatible domains with a free-running partition, such compatible domains comprising domains depending upon at least one of symbolic constant registers or free-running registers and arbitrarily-clocked registers.

At block 510, system 200 combines compatible domains for performing peripheral retiming of primary inputs/primary outputs (PIs/POs), identifying PIs that combinationally fan-out only to a single domain, and combine those PIs into that domain. At block 512, system 200 combines compatible domains with a free-running partition, optionally modelling compatible domains adjacent to free-running domain as free running, which can enable fine-grained retiming within next-state function MUXes. At block 512, the compatible selected clocked domains and the adjacent free-running domain have identically clocked registers (i.e., the same clock domain of the multiple clock domains).

Embodiments of the disclosure enable enhanced hierarchical, hybrid domain-based and free-running retiming of a multi-clock-domain netlist, for example implementing domain combining operations at block 512. Note that free-running retiming of a clocked register (with color (R)!=ONE), where next-state function MUXes and clocks are not suppressed from the retiming-graph cannot reduce register count by eliminating a clocked register. Only domain-based retiming can reduce the count of such clocked registers. However, domain-based retiming cannot directly allow retiming across a gate, which is a combinational function of multiple registers with different clocks; those multi-colored gates are suppressed from the retiming-graph, and retiming can only be done within uniformly singly colored partitions. However, performing free-running retiming on a clocked register can sometimes yield reductions adjacent to that clocked register, by relocating unclocked registers (with color (R)==ONE) across and around them.

Figure 7:
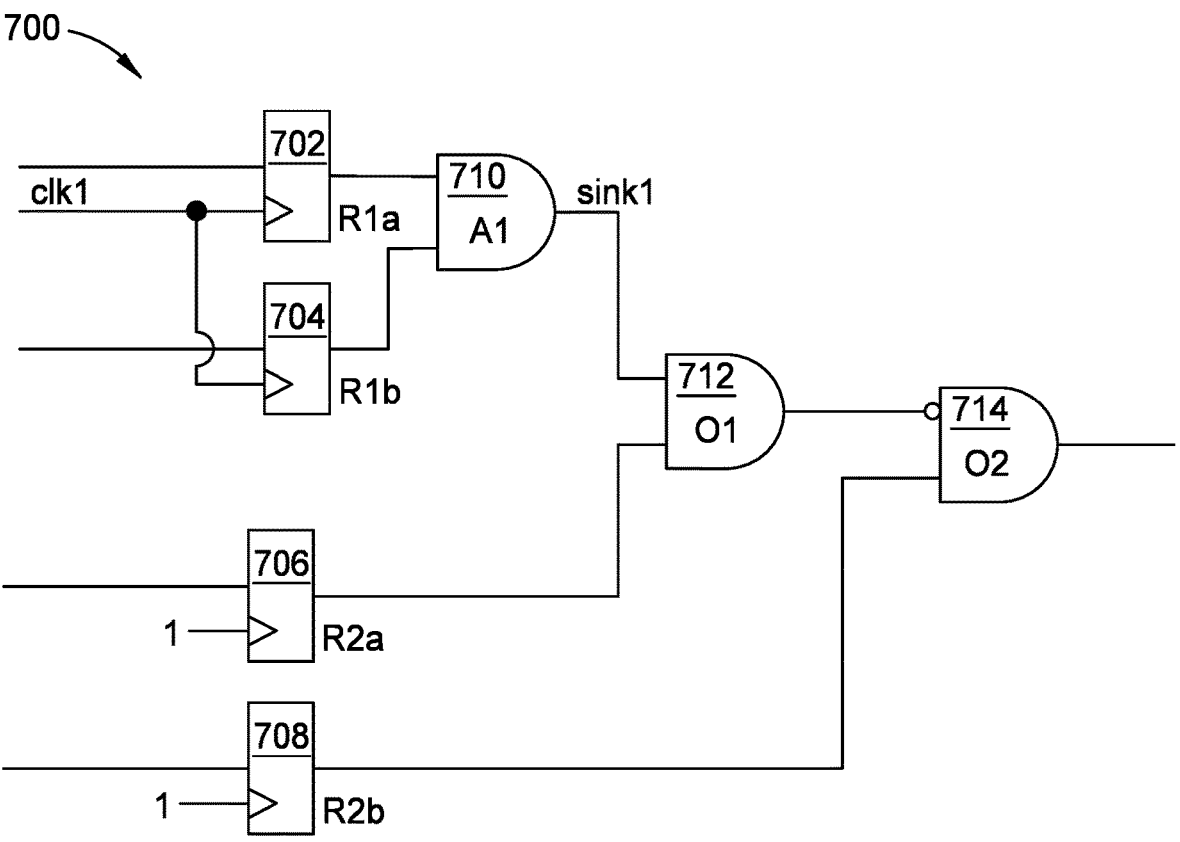
FIG. 7 schematically illustrates an example netlist representation for one-join retiming of one or more disclosed embodiments.

Referring also to FIG. 7, a netlist representation 700 schematically illustrates one-join retiming operations of one or more disclosed embodiments. In FIG. 7, a pair of registers 702, 704 R1a and R1b are clocked registers (e.g., with clock input clk1 in one partition), and a pair of registers 706, 708 R2a and R2b are free-running registers in another partition. A first AND gate 710 receives a respective input from the clocked registers 702, 704 R1a and R1b, and provides output (e.g., sink1) to an input of second AND gate 712, O1, which receives an input from free running registers 706 R2b. A third AND gate 714 receives a respective input from the second AND gate 712, O1 and the free running register 108 R2b. For the clocked registers 702, 704 R1a and R1b domain-based retiming can reduce register-count by one by forward retiming across AND gate 710 A1. The AND gates 712 O1 and 714 O2 have two different domains in their combinational fanin, and thus are blocked from domain-based retiming, preventing registers 706, 708 R2a and R2b from being retimed. With the netlist 700 free-running retimed in accordance with disclosed embodiments, registers 702, 704 R1a and R1b can be forward-retimed yet will remain in their current locations in the retimed netlist; by forward-retiming registers 702, 704 R1a and R1b, this allows registers 706, 708 R2a and R2b to be forward-retimed across the AND gates 712 O1 and 714 O2 to reduce their register-count by one.

The enhanced Hybrid Domain-Based Retiming Algorithm 600 of FIGS. 6A and 6B can enable such free-running retiming reductions for degenerate logic regions by treating selective clocked registers as free-running. (e.g. blocks 506, 512 in FIG. 5A) if its next-state function MUX logic is observable by other logic, or if in a small partition containing only one register. FIGS. 6A and 6B can nonetheless prevent retiming across any multi-domain gate, beyond this selective conversion to free-running; it could only forward-retime register R1a and register R1b but not register R2a or register R2b.

An oneJoin root gate comprises a topologically shallowest gate that is combinationally sensitized by one color (R)!=ONE clocked register, and by one color (R)==ONE free-running register. In FIG. 7, the AND gate 712 O1 is a oneJoin gate, where one input is combinationally-sensitized by clocked-registers 702, 704 R1a and R2a, while its other input is combinationally-sensitized by free-running registers 706, 708 R2a and R2b.

At block 514, system 200 creates a retiming graph for each partition. Optionally, system 200 models selected domains as a single hypergraph node in retiming graph, where all gates within the hypergraph node are atomically retimed (i.e., each gate is lagged by an identical amount). At block 516, system 200 prunes or removes fanout edges from symbolic constant register domain from the retiming graph. At block 518, system 200 prunes fanout edges from oscillator registers from the retiming graph. At block 520, system 200 optimally retimes each resulting partition, using an arbitrary retiming-solver algorithm to provide a retiming result. At block 522, system 200 forms a behaviorally equivalent netlist from the retiming result (mapped to original netlist gates). At block 524, system 200 optionally returns to block 506, accounting for retimed register placement, and adjustment of which domains are modeled as free-running domains (e.g., 510, 512) and/or hypergraph nodes (e.g., 514). The operations continue as before and system 200 forms the behaviorally equivalent netlist from the updated retiming result at block 522.

Referring also to FIG. 8, embodiments of the disclosure can allow a majority of additional free-running reductions to be achieved using a single retiming-graph and single retiming-algorithm solution (empirically, >90% of that achievable by iterating free-running and domain-based retiming.) FIG. 8 illustrates a OneJoin Extended color_fanout ( ) Algorithm 800 for implementing enhanced retiming of one or more disclosed embodiments.

A disclosed oneJoin retiming algorithm includes system 200 identifying and remembering the oneJoin gates, for later retimed-netlist reconstruction (e.g., block 522 of FIG. 5A.) System 200 marks the clocked input of these oneJoin gates (e.g., sink1 input to AND gate 712 O1) as retiming-graph sinks (e.g., block 522 of FIG. 5A.) This operation is provided to ensure that their latency is not changed by retiming; i.e. a retimed register will persist between the original clocked register and the oneJoin clocked-input. Otherwise, a behaviorally equivalent retimed netlist may not be guaranteed, (e.g., that must be formed at block 522 of FIG. 5A.). System 200 marks the oneJoin gates as having free-running domain==ONE, allowing that color to propagate to fanout logic (e.g. to AND gate 714 O2 in FIG. 7). System 200 optionally suppresses the oneJoin clocked-input from the retiming graph, effectively partitioning the clocked domain from the unclocked domain and allowing them to be independently lagged. System 200 performs special handling necessary when reconstructing the retimed netlist with oneJoin gates, to ensure that a behaviorally equivalent retimed netlist is obtained (e.g., formed at block 522 of FIG. 5A.). Specifically, system 200 forms the clocked-register colored input (e.g., such as color (B) sink1 input to AND gate 712 O1) of the boundary-gates over the unclocked next-state function of the topologically-nearest fanin retimed register within that domain, as done with free-running retiming.

Implementing the disclosed oneJoin retiming algorithm includes several modifications of the enhanced Hybrid Domain-Based Retiming Algorithm 600 of FIGS. 6A and 6B. First, we enumerate oneJoin root gates (on queue OneJoinRoots) and adjust the color_fanout ( ) function on line 37 of FIG. 6B as provided in the pseudo code of FIG. 8. Note that the fanout of the oneJoinRoots would traditionally be blocked from domain-based retiming, because they have multiple colors. By replacing color_fanout ( ) on line 37 of FIG. 6B with color_fanout_oneJoin ( ) of FIG. 8, this logic now has color==ONE, and thus the free-running fanin registers that contributed this color may be retimed through this retiming logic.

Referring also to FIG. 9, a final modification of the algorithm domain_retime (P, color) is depicted in FIG. 9, where domain_retime_oneJoin ( ) replaces domain_retime ( ) on lines 42A and 44 of FIG. 6B to yield a behaviorally equivalent netlist. Effectively, OneJoin addition depicted herein ensures that the clocked inputs to lagged OneJoinRoots sample a free-running lagged next-state function, as if retiming treated those registers as free running, while allowing a single retiming solution to perform domain retiming of those clocked registers. The replicated logic cone will replace the original logic cone in the retimed netlist, (e.g., in FIG. 7 this replaces AND gate 710 A1 with inputs connected to clocked-registers 702, 704 R1a and R2a with a retimed AND-gate having inputs connected to the next state functions clocked-registers 702, 704 R1a and R2a), and thus does not add to retimed netlist size. A major benefit is that this modeling yields an optimal combination of domain-based retiming and free-running retiming within one call to the retiming-algorithm, using a single retiming-graph for the netlist.

Embodiments of the disclosure enable retiming across the combinational fanout of OneJoin gates that are sensitized both by clocked and free running registers. Additional minor reductions may be possible by treating the entire netlist as a free-running netlist; while clocked registers themselves cannot be relocated when modeled as free running; it sometimes is possible to relocate free-running registers across these domain partitions, yielding adjacent reductions. Retiming a large, unpartitioned netlist can be computationally expensive; potentially hours for very-large netlists.

Embodiments of the disclosure introduce a hierarchical method to achieve these additional reductions with much lesser run-time, operating on much-smaller retiming-graphs. In a disclosed embodiment, the Hybrid Domain-Based Retiming Algorithm 600 of FIGS. 6A and 6B enhanced with FIGS. 8 and 9 is first performed to yield significant retiming benefits, and then the algorithm of FIG. 10 and/or FIG. 11 is used to fine-tune the resulting netlist.

Referring to FIG. 10 and FIG. 11, FIG. 10 illustrates example pseudo code of a Hierarchical, Hybrid Domain-Based Retiming Algorithm 1000 of disclosed embodiments. FIG. 11 illustrates example pseudo code for another Iterative, Hierarchical Retiming Algorithm 1100 of disclosed embodiments.

Note that the Hierarchical, Hybrid Domain-Based Retiming Algorithm 1000 of FIG. 10 allows relocating free running registers across (versus within) domain-partitions. Effectively, an entire domain-partition in the original netlist is mapped to a single node in the retiming graph. This is similar to viewing the original netlist as a directed hypergraph where color={ONE} where gates are 1:1 present in the retiming graph, while each domain-partition is a single hypergraph node in the retiming graph. Because the retiming graph has a single node for an entire domain, finer-grained retiming is not possible within those domains. In disclosed embodiments, FIGS. 6A, 6B, together with FIGS. 8 and 9 are processed before FIG. 10, and/or FIG. 11. By treating domain-partitions as single hyper-graph nodes, a huge practical speedup is enabled, yielding the vast-majority of additional retiming benefit, (e.g., as provided at block 514 in FIG. 5A.)

The Iterative, Hierarchical Retiming Algorithm 1100 of FIG. 11 can make this processing incremental, enabling an opportunity for retiming improvements (e.g., after retiming of FIGS. 6A, 6B, together with FIGS. 8 and 9) through relocating free-running registers within a domain-partition, treating that domain as free-running. The Iterative, Hierarchical Retiming Algorithm 1100 of FIG. 11 can yield small retiming optimizations within the domain-partition, as an alternative to (or post-process of) FIG. 10.

The Iterative, Hierarchical Retiming Algorithm 1100 of FIG. 11 can be applied as a standalone optimal retiming algorithm; for example first an individual domain-partition P (e.g., line 12 of FIG. 11) can be retimed as before, and if no retiming benefit is found. FIG. 11 can augment that domain-partition with adjacent logic until retiming benefit is obtained, or the entire netlist has been atomically considered. Optionally such retiming includes hypergraph compression of individual domains as single retiming graph nodes. Practically, a near-optimal timing result can be achieved using retiming of FIGS. 6A, 6B together with FIGS. 8 and 9 of disclosed embodiments, to avoid the relatively extreme runtime cost of monolithic free-running retiming.

In disclosed embodiments, system 200 performs post-processing retiming of FIG. 10 (or FIG. 11 using hypergraph type compression of domains). Finally, system 200 can perform fine-tune retiming of the Iterative, Hierarchical Retiming Algorithm 1100 of FIG. 11, selectively using for example 1:1 retiming-graph modeling on subsets of the netlist where free-running registers fan out to clocked domains. Such 1:1 retiming-graph modeling can enable types of clock retiming, and finer-grained placement of retimed registers within clock MUXes, not before possible.

Disclosed embodiments provide an enhanced retiming for yielding superior retiming results for symbolic constant registers using a customized retiming-graph and retiming-solver. Symbolic constant registers are commonly used in industrial designs to implement configurable runtime modes of a given design. Symbolic-constant registers are sometimes called chicken-switches or configuration registers. Symbolic-constant registers may be considered as having color=ZERO, because they always hold their initial value. It thus is possible to domain-retime the symbolic-constant domain using the above-disclosed algorithms.

Referring to FIGS. 12 and 13, an example pseudo code of a Zero- and One-Join-Extended color_fanout ( ) Algorithm 1200 of FIG. 12 and an example pseudo code of a Zero-Clock-Extended domain_retime ( ) Algorithm 1300 enable enhanced Symbolic Constant register domain retiming of disclosed embodiments. The disclosed Algorithm 1200 of FIG. 12 and Algorithm 1300 of FIG. 13 enable greater register-reduction, that can yield additional area, power, and delay reductions: by reducing register count and circuit wire-length including retimed symbolic constant registers.

The disclosed Algorithm 1200 of FIG. 12 and Algorithm 1300 of FIG. 13 are based on observations as follows. First, because symbolic-constant registers never toggle, retiming of a symbolic-constant domain need not strictly honor conditions such as preservation of sequential latency where exactly one retimed register will exist between the original color=ZERO register and fanout to another color. Second, the join of color=ZERO and any other color need not be blocked from retiming. Instead, color=ZERO gates may be completely partitioned from the rest of the netlist, so that the color=ZERO domain can be retimed individually, and output edges from this domain to other domains can be suppressed from the retiming-graph (e.g., to improve retiming run-time, and optimality of the other domains). Note that the latter suppression is valid even when doing min-delay or constrained min-area retiming, because color=ZERO is static logic that does not toggle during functional mode of the design, those suppressed output wires do not significantly penalize timing. The Zero- and One-Join-Extended color_fanout ( ) Algorithm 1200 of FIG. 12 shows the extension of FIG. 8 for coloring the color==ZERO domain and its fanout.

The ZeroClock-Extended domain_retime ( ) Algorithm 1300 of FIG. 13 shows the extension of FIG. 9 to allow optimal retiming of the color==ZERO domain, independently from its fanout domains, where the domain_retime_zeroClock ( ) replaces the domain_retime ( ) on line 42A of FIG. 6B for the color==ZERO domain. Retiming of other domains proceeds as above, given the improved coloring of the Zero- and One-Join-Extended color_fanout ( ) Algorithm 1200 of FIG. 12, and suppressing fanout edges from ZeroRoots from the retiming-graph of other partitions. Retiming the color={ZERO} domain, and creating this portion of the retimed netlist is detailed in FIG. 14.

The ZeroClock-Extended domain_retime ( ) Algorithm of FIG. 13 provides the ability to yield superior retiming results for the Symbolic Constant register domain itself, and to automatically produce a modified configuration consistent with initial values of the retimed netlist.

The ZeroClock-Extended domain_retime ( ) Algorithm of FIG. 13 provides the ability to map the initial-values of color={ZERO} registers, such as for Synthesis or Design applications, if parameter RemapInitialValues is defined. These color=ZERO registers are often used to configure a hardware design to behave in different modes, e.g. using a set of legal initial values for one or more collections of registers or groups of symbolic-constant registers. A collection of such symbolic-constant registers and initial value pairs often is used for configuring or initializing hardware devices of a hardware system. Disclosed embodiments can relocate such symbolic-constant registers closer to their fanout symbolic-constant register output sink logic, shortening wire-length and providing additional area and power benefit. To enable a fully-automated solution, the Zero-Clock-Extended domain_retime ( ) Algorithm of FIG. 13 defines how the original symbolic-constant registers can be associated with their retimed symbolic-constant registers, along with how to map the initial values for those original symbolic-constant registers to behaviorally-equivalent initial values for the retimed symbolic-constant registers. The ZeroClock-Extended domain_retime ( ) Algorithm of FIG. 13 illustrates associating the original configuration registers with their retimed registers, along with mapping the initial values for those original registers to behaviorally-equivalent initial values for the retimed symbolic-constant registers of disclosed embodiments.

FIG. 14 illustrates example pseudo code for an example ColorRandoms Algorithm 1400, Enabling Domain-Lagging of RANDOM Gates for implementing enhanced retiming of one or more disclosed embodiments. The ColorRandoms Algorithm 1400, Enabling Domain-Lagging of RANDOM Gates can enable enhanced peripheral retiming of disclosed embodiments.

Peripheral retiming is a variant where registers can be borrowed or discarded from the inputs (RANDOM gates) and outputs of a netlist. In a Verification context, outputs typically refer to the targets and constraints of the testbench. In Synthesis, the outputs are primary outputs. Retiming of outputs is enabled by not marking the output nodes as sinks on the retiming graph, allowing the outputs to be arbitrary retimed vs. requiring registers to be relocated between their original placement and these sinks. Retiming of inputs is disallowed by not importing gates in the combinational fanout of RANDOMs into the retiming graph, effectively forcing them to not be lagged; otherwise, they may be lagged during retiming_solve. Peripheral retiming is typically only used in Verification, because Synthesis typically is forced to preserve input/output behavior of a netlist, as confirmed by equivalence checking. Though in a Synthesis or Design context, peripheral retiming can be used in design-space exploration, e.g. to indicate if retiming should be considered across unit boundaries for higher-quality chip logic.

In a verification context, safety targets that are forward-retimed (resulting in discarded registers) must be verified as being correct (unassertable) for as many time-steps as they are lagged, confirming that the propagation of the initial-values of those forward retimed registers cannot falsify those targets. Once this bounded model check is completed, it is safe to forward-retime those safety-properties and verify the resulting retimed netlist, if special care is taken to synchronize the amount of retiming with any constraints. Liveness properties may be forward retimed without a need to perform this bounded model check, because a failure of a liveness property involves an infinite-length counterexample trace.

RANDOM gates that are forward-retimed borrow registers from that RANDOM gate. The resulting borrowed register must obtain a unique RANDOM gate as initial-value, in addition to a unique RANDOM gate as its next-state function (often represented by reusing the retimed RANDOM gate itself). Intuitively, forward-retiming a RANDOM gate first converts that RANDOM gate to a register with a unique RANDOM-gate as initial-value, and another unique RANDOM-gate as next-state function: this modeling behaves the same as the original RANDOM, producing a unique nondeterministic value every time-step. Forward retiming effectively moves this register. As that borrowed register is forward retimed across fanout gates, the complexity of the retimed initial value increases, effectively cloning the retimed-across gates as part of the retimed initial value.

Traditional retiming arrangements generally have not addressed the peripheral retiming of domain-based inputs and outputs. Embodiments of the disclosure introduce several improvements to peripheral retiming in the presence of domain-based registers based upon the observations or conditions as follow.

First. it is possible to domain-lag a safety-target gate after validating that it cannot be asserted at time=0, by replacing that target by the conjunction of the domain's clock and the lagged gate. If the lagged safety-target happens to be a register, the retimed property is the conjunction of its clock and new_value. This enables not marking domain-based target gates as retiming sinks, enabling more flexibility to the retiming process. Practically this trivializes any retimed safety-properties of color=ZERO, because this conjunction is ZERO (never assertable). Though it is not safe to domain-lag constraint or liveness properties, because doing so loses the ability for that output to remember the last update when its clock was asserted, interfering with correct evaluation of the constraint or livelock over time.

Second, the bounded-model-check of a safety target gate necessary to enable its lagging can occasionally be highly unscalable. Traditional retiming-for-Verification always separates that bounded model-check from verification of the remaining time-steps (on the retimed netlist), and can become stuck if the bounded model-check is too difficult to prove. Practically, it is often better to perform retiming incrementally, lagging each gate at most onc-step. Safety-targets can be pre-verified using bounded model checking for one time-step with a resource limit before attempting a possible lagging of one. This bounded model-check is useful to complete in the overall verification context anyway, if not unscalable. If that bounded model-check does not complete for a given safety-target, the given safety-target can be introduced as a sink of the retiming graph to prevent lagging only of that single gate. This enables retiming to compute an optimized netlist that fully preserves Verification, e.g. to use in semi-formal verification, without becoming stuck trying to complete an unscalable bounded model check. Outputs that cannot be retimed, such as domain-based livelock gates or constraints, are also selectively marked as sinks in the retiming-graph.

Third: it is sometimes possible to treat the color of a RANDOM gate g1 the same as that of registers in their combinational fanout if the following conditions hold for each combinational fanout path from g1; 1) if all fanout paths from g1 to combinational-fanout registers have clocked registers with the same color (clock) c1; 2) if those fanout paths all pass through the new_value input of those clocked registers; not through clock; and 3) if those fanout paths do not encounter any initial-value functions or outputs, (e.g., livelock targets or constraints), or retimeable outputs of color different than clock c1.

If these conditions all hold, this implies that RANDOM gate g1 is only sampled by the netlist concurrently with an assertion of clock c1; and the clocking of the fanout registers imposes an observability don't care on its values. This implies that it preserves Verification to replace that RANDOM gate g1 by a clocked register of color c1, with a unique RANDOM gate as initial value, and with new_value being another unique RANDOM gate (which practically can reuse the original RANDOM gate); and then domain-based retiming can forward-retime this borrowed clocked register. Practically, this allows peripheral retiming to yield additional register reductions and movement, by selectively coloring amenable RANDOM gate fanout to allow fewer, larger domains that may be retimed within. Without this optimization (as depicted in color_fanout ( ) of FIG. 6B), RANDOM gates are treated as color==ONE and borrowed registers will have free-running clocks. With this optimization, we introduce an additional fanin-coloring algorithm to set the color of amenable RANDOM gates, and then uniform-color partitioning can work with fewer, larger domains. The function colorRandoms ( ) of FIG. 14 is ideally called immediately before the color_fanout ( ) process in FIG. 6B (before line 36), after fine-tuning of register domains to selectively mark certain clocked registers as free running, and allowing color_fanout ( ) to reuse the resulting seeded RANDOM colors.

FIG. 15 illustrates example pseudo code for an example Trace-Lifting Algorithm 1500 for Domain-Lagged RANDOM Gates for implementing enhanced retiming of one or more disclosed embodiments. In a Verification context, if domain lagging of RANDOMs is performed, an additional process is necessary to map a trace obtained on the retimed-netlist to one consistent with the original netlist. Note that domain-lagging a RANDOM gate results in a retimed netlist that only samples that RANDOM once per assertion of the corresponding clock; whereas in the original netlist, RANDOM gates can change values every time-step. In the original netlist, it is thus necessary to stutter values to domain-lagged RANDOMs to hold their values between assertions of the corresponding clocks to ensure a consistent trace lifting process. Otherwise, reconstructing a counterexample trace consistent with the original testbench may not properly witness a failure of the corresponding property, breaking the Verification tool.

It is also possible to directly lift values for other domain-lagged gates, if desired (not just RANDOMs), by simulating their clocks to determine when they are asserted and repeating (stuttering) last values between clocks. Though practically, a Verification tool using retiming as one of several engines is likely to reconstruct (via simulation) the original trace on the imported, unmodified testbench anyway. The Trace-Lifting Algorithm 1500 for Domain-Lagged RANDOM Gates of FIG. 15 ensures that process will work as desired. It is also noteworthy that Trace-Lifting Algorithm 1500 for Domain-Lagged RANDOM Gates of FIG. 15 maximally preserves unknown RANDOM values, which is useful in various contexts such as abstraction-refinement or trace simplification, and to better highlight which RANDOM values are critical to the counterexample trace.

Methods and systems of disclosed embodiments implement scalable, optimal retiming of a multi-clock-domain netlist comprising creating a retiming graph from an imported netlist, mapping netlist gates and retiming graph nodes. The retiming system computes an optimal result on the retiming graph using a retiming solver. The retiming system form a behaviorally equivalent netlist from the retiming result (e.g., mapped to original netlist gates.) Run-time optimizations of disclosed methods and systems useful to scale retiming to multi-million gate netlists with a few seconds of run-time, with no loss in optimality include the following.

In one runtime optimization as indicated at block 516, system 200 prunes fanout edges from symbolic constant register domain from retiming graph. In another runtime optimization as indicated at block 516, system 200 prunes fanout edges from oscillator registers from retiming graph. In another runtime optimization if all registers in a design are clocked by a global clock condition (e.g. that a global-clock signal evaluates to the same level or edge), possibly conjuncted by secondary clock-gating conditions on a per-register basis: system 200 can factor out (i.e., treat as constant-ONE) that global clock condition, temporarily treating it as TRUE. This converts any non-clock-gated registers to free-running acyclic registers, and simplifies clock-gated registers. Then system 200 may be run retiming on the global-clock-factored simpler netlist. Finally, when re-forming the retimed netlist, it is necessary for system 200 to fold (conjunct) that global clock condition back into all register clocks. In Verification, this can often be achieved by performing a logic-transform called phase abstraction, which converts an oscillating global clock to constant. In other contexts such as Synthesis, this explicit factor-then-reinsert of the global clock can be used to achieve similar retiming results, without the netlist churn of running a prior transformation.

Symbolic constant registers and global clock oscillators often have high fanout degree (i.e. many output edges) in the netlist, and thus these runtime optimizations are often very useful to prune a large number of edges in the retiming graph, and enable greater partitioning. These optimizations also allow reusing as many original gates as possible to implement the retimed netlist (e.g., to avoid introducing a new retimed-register for an oscillator), which has other benefits in a Verification tool. For example, trace-lifting of FIG. 15 can directly clone more values with less renaming and lagging; and equivalence-checking can correlate more logic between the two designs using signal names with less logic perturbation.

Referring to FIG. 5B, an illustrated method 530 of disclosed embodiments effectively and efficiently implements retiming of a multi-clock-domain netlist with significantly reduced retiming runtime over traditional retiming arrangements. At block 532, system 200 imports a netlist 204 for a given IC design. At block 534, system 200 translates the netlist into a normalized netlist with implicitly clocked register primitives. At block 536, system 200 partitions the normalized netlist into regions with identically clocked registers and identifies selected clock domains as free-running domains in the normalized netlist. At block 537, system 200 identifies two compatible clock domains based on at least one of symbolic-constant registers or free-running registers, and arbitrarily-clocked registers. At block 538, system 200 combines the two compatible clock domains to generate at least one of a combined clock domain and free-running partition, a combined free-running and arbitrarily-clocked partition, a combined free-running and symbolic-constant register partition, or a combined symbolic-constant register and arbitrarily-clocked partition. At block 540, system 200 creates a respective retiming graph for each of the at least one of the combined clock domain and free-running partition, the combined free-running and arbitrarily-clocked partition, the combined free-running and symbolic-constant register partition, or the combined symbolic-constant register partition and arbitrarily-clocked partition. At block 542, system 200 retimes the respective retiming graphs using a retiming solver to provide a retiming result. For example, system retimes the respective retiming graphs (e.g., in a single run) using the retiming solver to provide the retiming result. At block 542, system 200 forms, based on the retiming result, a behaviorally equivalent retimed netlist of the imported netlist.

Referring to FIG. 5C, an illustrated method 550 of disclosed embodiments effectively and efficiently implements retiming of a multi-clock-domain netlist with significantly reduced retiming runtime over traditional retiming arrangements. At block 552, system 200 imports a netlist 204 for a given IC design, where clock domain information is included in the imported netlist. At block 554, system 200 partitions the netlist by clock domains with identically clocked registers for each of the multiple clock domain. At block 556, system 200 identifies selected domains as free-running. At block 557, system 200 identifies two compatible clock domains based on at least one of symbolic registers or free-running registers, and arbitrarily-clocked registers. At block 558, system 200 combines the two compatible clock domains to generate at least one of a combined clock domain and free-running partition, or a combined symbolic-constant register and arbitrarily-clocked partition. At block 560, system 200 creates a respective retiming graph for each of the at least one of the combined clock domain and free-running partition or the combined symbolic-constant register and arbitrarily-clocked partition, and for each clock domain partition of the multiple clock domains and models at least one clock domain partition as a single hypergraph node. At block 562, system 200 optimally retimes the respective retiming graphs, using a retiming solver to provide a retiming result, where each hypergraph node is atomically retimed (i.e., all gates in the partition of that hypergraph node are lagged the same amount). At block 564, system 200 forms, based on the retiming result, a behaviorally equivalent retimed netlist of the imported netlist.

While the foregoing is directed to embodiments of the present invention, other and further embodiments of the invention may be devised without departing from the basic scope thereof, and the scope thereof is determined by the claims that follow.

What is claimed is:

1. A method comprising:
   importing a netlist for a given integrated circuit (IC) design; the netlist comprising multiple clock domains; translating the imported netlist into a translated netlist comprising a retiming graph of implicitly clocked register primitives;
   partitioning the translated netlist into regions with identically clocked registers to create a clock domain partition and a free-running partition for each of the multiple clock domains;

identifying two compatible clock domains based on at least one of: (i) symbolic-constant registers or (ii) free-running registers, and arbitrarily-clocked registers;
   combining the two compatible clock domains to generate at least one of a combined clock domain and free running partition, a combined arbitrarily-clocked and free-running partition, a combined free-running and symbolic-constant register partition, or a combined arbitrarily-clocked and symbolic-constant register partition;
   creating a respective retiming graph for each of the least one of the combined clock domain and free running partition, the combined arbitrarily-clocked and free-running partition, the combined free-running and symbolic-constant register partition, or the combined arbitrarily-clocked and symbolic-constant register partition;
   retiming the respective retiming graphs using a retiming solver to provide a retiming result; and
   forming, based on the retiming result, a behaviorally equivalent retimed netlist of the imported netlist.

2. The method of claim 1, wherein the translated netlist comprises a normalized netlist with implicitly clocked register primitives comprising a single clock and a next-state function.

3. The method of claim 1, wherein partitioning the translated netlist into regions with identically clocked registers comprises reverse engineering a clock domain of multiple implicitly clocked register primitives based on the imported netlist or the translated netlist.

4. The method of claim 1, wherein creating the respective retiming graph further comprises creating a respective retiming graph for each clock domain partition of the multiple clock domains and modeling at least one clock domain partition as a hypergraph node, wherein each gate of the hypergraph node is atomically retimed.

5. The method of claim 1, further comprises identifying peripheral inputs having combinational fanout only to registers of a single clock domain; combining the inputs into the single clock domain and partitioning the identified inputs and combinational logic between the inputs and the registers of the single clock domain into a single clock domain netlist partition; creating a retiming graph for the single clock domain netlist partition; and performing peripheral retiming of the retiming graph for the single clock domain netlist partition using a retiming solver for the single clock domain netlist partition to provide a retiming result.

6. The method of claim 1, wherein forming, based on the retiming result, the behaviorally equivalent retimed netlist further comprises identifying a set of gates on a boundary between combined domains; identifying a subset of the boundary gates that are lagged; replicating the combinational logic between the lagged boundary gates and retimed registers in a fanin of the lagged boundary gates; and connecting replicated logic to a clocked next-state function of the retimed registers.

7. The method of claim 1, further comprises performing logic rewriting of the translated netlist for reducing gate-count to provide a simplified netlist and analyzing the simplified netlist to infer clocking conditions of recognizable registers based on a register representation and a next-state function.

8. The method of claim 1, further comprises enabling hybrid free-running and domain-based retiming to allow relocating free running registers across domain-partitions;

and to allow relocating free-running registers within a clock domain-partition, defining the clock domain-partition as free-running.

9. The method of claim 1, further comprises identifying a symbolic constant register domain and retiming at least one gate in a fanout of a symbolic constant register domain to reduce a number of symbolic constant registers.

10. The method of claim 1, further comprises identifying a symbolic constant register domain; computing a min-cut between a symbolic-constant register location and a sink logic, where the min-cut comprising a symbolic-constant register input source and a symbolic-constant register output sink; and injecting a retimed symbolic constant register at the symbolic constant register output sink to reduce a number of symbolic constant registers.

11. A system, comprising:

a processor; and a memory, wherein the memory includes a computer program product configured to perform operations to implement retiming of multi-clocked netlists, the operations comprising:

importing a netlist for a given integrated circuit (IC) design; the netlist comprising multiple clock domains; translating the imported netlist into a translated netlist comprising a retiming graph of implicitly clocked register primitives;

partitioning the translated netlist into regions with identically clocked registers to create a clock domain partition and a free-running partition for each of the multiple clock domains;

identifying two compatible clock domains based on at least one of: (i) symbolic-constant registers or (ii) free-running registers, and arbitrarily-clocked registers;

combining the two compatible clock domains to generate at least one of a combined clock domain and free running partition, a combined arbitrarily-clocked and free-running partition, a combined free-running and symbolic-constant register partition, or a combined arbitrarily-clocked and symbolic-constant register partition;

creating a respective retiming graph for each of the least one of the combined clock domain and free running partition, the combined arbitrarily-clocked and free-running partition, the combined free-running and symbolic-constant register partition, or the combined arbitrarily-clocked and symbolic-constant register partition;

retiming the respective retiming graphs using a retiming solver to provide a retiming result; and forming, based on the retiming result, a behaviorally equivalent retimed netlist of the imported netlist.

12. The system of claim 11, wherein the translated netlist comprises a normalized netlist with implicitly clocked register primitives comprising a single clock and a next-state function.

13. The system of claim 11, further comprises performing logic rewriting of the translated netlist for reducing gate-count to provide a simplified netlist and analyzing the simplified netlist to infer clocking conditions of recognizable registers based on a register representation and a next-state function.

14. The system of claim 11, further comprises identifying inputs having combinational fan-out only to registers of a single clock domain; combining the inputs into the single clock domain; and partitioning the inputs and combinational logic between the inputs and the registers of the single clock domain into a single clock domain netlist partition.

15. The system of claim 11, further comprises identifying a symbolic constant register domain and computing a min-cut between a symbolic constant register location and sink logic, the min-cut comprising a symbolic constant register input source and a symbolic constant register output sink; and retiming a respective retiming graph for a symbolic constant register partition to relocate source symbolic constant registers closer to a symbolic constant register output sink, to reduce a symbolic constant register count and to reduce circuit wire-length for the retimed symbolic constant register partition.

16. A computer program product to implement retiming of multi-clocked netlists, the computer program product comprising:

a computer-readable storage medium having computer-readable program code embodied therewith, the computer-readable program code executable by one or more computer processors to perform an operation comprising:

importing a netlist for a given integrated circuit (IC) design; the netlist comprising multiple clock domains; translating the imported netlist into a translated netlist comprising a retiming graph of implicitly clocked register primitives;

partitioning the translated netlist into regions with identically clocked registers to create a clock domain partition and a free-running partition for each of the multiple clock domains;

identifying two compatible clock domains based on at least one of: (i) symbolic-constant registers or (ii) free-running registers, and arbitrarily-clocked registers;

combining the two compatible clock domains to generate at least one of a combined clock domain and free running partition, a combined arbitrarily-clocked and free-running partition, a combined free-running and symbolic-constant register partition, or a combined arbitrarily-clocked and symbolic-constant register partition;

creating a respective retiming graph for each of the least one of the combined clock domain and free running partition, the combined arbitrarily-clocked and free-running partition, the combined free-running and symbolic-constant register partition, or the combined arbitrarily-clocked and symbolic-constant register partition;

retiming the respective retiming graphs using a retiming solver to provide a retiming result; and forming, based on the retiming result, a behaviorally equivalent retimed netlist of the imported netlist.

17. The computer program product of claim 16, wherein the translated netlist comprises a normalized netlist with implicitly clocked register primitives comprising a single clock and a next-state function.

18. The computer program product of claim 16, further comprises identifying inputs having combinational fan-out only to registers of a single clock domain; combining the inputs into the single clock domain; and partitioning the inputs and combinational logic between the inputs and the registers of the single clock domain into a single clock domain netlist partition.

19. The computer program product of claim 16, further comprises identifying a symbolic constant register partition and retiming at least one gate in a fanout of a symbolic constant register to reduce a number of the symbolic constant registers.

20. The computer program product of claim 16, further comprises performing logic rewriting of the translated netlist for reducing gate-count to provide a simplified netlist and analyzing the simplified netlist to infer clocking conditions of recognizable registers based on a register representation and a next-state function.

* * * * *